US012089299B2

(12) United States Patent
Lollar et al.

(10) Patent No.: US 12,089,299 B2
(45) Date of Patent: Sep. 10, 2024

(54) ONE PIECE HEATER RACK, HEATER ASSEMBLY USING THE HEATER RACK, AND METHOD OF USE

(71) Applicant: TUTCO, LLC., Cookeville, TN (US)

(72) Inventors: James Patrick Lollar, Cookeville, TN (US); Devin Ridley, Cookeville, TN (US)

(73) Assignee: TUTCO, LLC, Cookeville, TN (US)

( * ) Notice: Subject to any disclaimer, the term of this patent is extended or adjusted under 35 U.S.C. 154(b) by 988 days.

(21) Appl. No.: 16/879,899

(22) Filed: May 21, 2020

(65) Prior Publication Data

US 2020/0389942 A1 Dec. 10, 2020

Related U.S. Application Data

(60) Provisional application No. 62/857,348, filed on Jun. 5, 2019.

(51) Int. Cl.

*H05B 3/26* (2006.01)
*H05B 1/02* (2006.01)
*H05B 3/16* (2006.01)

(52) U.S. Cl.

CPC ............... *H05B 3/265* (2013.01); *H05B 3/16* (2013.01); *H05B 1/0275* (2013.01); *H05B 2203/022* (2013.01)

(58) Field of Classification Search

CPC .... H05B 3/16; H05B 3/265; H05B 2203/022; H05B 1/0275
USPC .......................................................... 219/543
See application file for complete search history.

(56) References Cited

U.S. PATENT DOCUMENTS 3,952,409 A * 4/1976 Allison .................... H05B 3/32 219/532
4,528,441 A * 7/1985 Seal ......................... H05B 3/16 219/532
4,730,377 A * 3/1988 Sherrill .................... H05B 3/16 29/897
5,122,640 A * 6/1992 Holmes .................... H05B 3/32 219/532
5,641,420 A * 6/1997 Peterson .................. H05B 3/16 219/536
5,925,273 A * 7/1999 Sherrill .................... H05B 3/16 219/532

(Continued)

FOREIGN PATENT DOCUMENTS

CN 1468031 1/2004
CN 208175024 11/2018

*Primary Examiner* — Eric S Stapleton
(74) *Attorney, Agent, or Firm* — Bauer & Joseph

(57) ABSTRACT

A one-piece heater rack includes a number of arrays of attachment nodes and a surrounding peripheral structure. The attachment nodes are configured to allow the attachment of ceramic supports, the ceramic supports designed to hold open type coil electrical resistance heating elements that make up of a heater assembly using the heater rack. The attachment nodes allow attachment of the ceramic supports from above and below the heater rack for ease of installation. The heater rack also includes other features that providing mounting support for other heater assembly elements like terminals, thermostats, temperature limit switches, and air flow control over and through the heater using the peripheral structure, the arrays of attachment nodes or combinations thereof.

23 Claims, 24 Drawing Sheets

(56) References Cited

U.S. PATENT DOCUMENTS

| | | | | |
|---|---|---|---|---|
| 6,020,577 | A * | 2/2000 | Barker | H01C 1/012 338/315 |
| 6,087,639 | A * | 7/2000 | Engelke | H05B 3/06 174/148 |
| 6,285,013 | B1 * | 9/2001 | Holmes | H01C 3/20 219/532 |
| 6,376,814 | B2 * | 4/2002 | Holmes | H05B 3/16 219/536 |
| 6,433,318 | B2 * | 8/2002 | Danko | H05B 1/02 219/532 |
| 6,593,553 | B2 | 7/2003 | Whitfield | |
| 6,593,554 | B2 * | 7/2003 | Danko | H05B 3/16 219/532 |
| 6,600,141 | B1 | 7/2003 | Danko et al. | |
| 6,624,398 | B2 | 9/2003 | Sherrill et al. | |
| 6,660,141 | B1 * | 12/2003 | Minter | G01N 27/3275 204/403.01 |
| 7,075,043 | B2 * | 7/2006 | Howard | H05B 3/16 219/536 |
| 9,055,613 | B2 | 6/2015 | Kutz | |
| 9,504,097 | B2 * | 11/2016 | Fowler | H05B 3/16 |
| 2001/0006171 | A1 * | 7/2001 | Holmes | H05B 3/16 219/536 |
| 2002/0017518 | A1 * | 2/2002 | Danko | H05B 3/16 219/541 |
| 2002/0023918 | A1 * | 2/2002 | Howard | H05B 3/32 219/536 |
| 2006/0000824 | A1 * | 1/2006 | Howard | H05B 3/16 219/536 |
| 2008/0173636 | A1 * | 7/2008 | Kutz | H05B 6/06 219/536 |
| 2008/0190912 | A1 * | 8/2008 | Yeung | H05B 3/26 219/443.1 |
| 2014/0231412 | A1 * | 8/2014 | Fowler | H05B 3/16 219/552 |
| 2017/0223775 | A1 * | 8/2017 | Scanlon | H05B 3/06 |
| 2018/0332668 | A1 * | 11/2018 | Lollar | H05B 3/16 |

* cited by examiner

136

ONE PIECE HEATER RACK, HEATER ASSEMBLY USING THE HEATER RACK, AND METHOD OF USE

FIELD OF THE INVENTION

The invention relates to a one piece heater rack designed to support one or more open type coil electrical resistance heating elements using ceramic supports, allow for flow of air parallel to the rack or flow of air through the rack, include structure as part of the one piece heater rack to accommodate mounting different heater components such as thermostats or linear temperature limit devices, and provide a rack configuration that minimizes the risk of the open type coil electrical resistance heating elements contacting parts of the rack and short circuiting.

BACKGROUND OF THE INVENTION

In the prior art, open type coil electrical resistance heater assemblies are commonly used in various heating applications. These types of heater assemblies use one or more open coil resistance elements that are mounted to a heater rack using ceramic supports.

One common problem with these type of open coil electric heater assemblies is the fact that many parts have to be compiled and assembled to complete a finished heater assembly. That is, one begins with a large list of items that must be fabricated separately, put together in some order and fashion, and then attached, welded or combined with all other parts for a finished heater assembly.

Additionally, often times during these operations, material is removed from a raw material stock, never to be utilized further and this wasted material contributes to the cost of the heater assembly.

An example of a heater assembly that utilizes a number of parts to make the assembly is disclosed in U.S. Pat. No. 6,624,398 to Sherrill et al. The insulator support structure in this heater may be unique but the heater includes many weld points and added parts for the final assembly to be mounted. The end result in this case is a heater assembly that requires many individual parts to be fabricated separately and extensively fastened together in order to include all required features and to provide a final assembly. The more parts are involved, the more complicated the assembly becomes and, the more features that are added, the more individual parts are needed.

U.S. Pat. No. 6,593,554 to Danko et al. is another example of a defined heater assembly that uses a unique insulator support structure but includes many weld points and added parts for the final assembly to be mounted. For example, this heater assembly, in addition to providing a frame for the heater, uses a separate metal plate to provide supports for the terminal ceramic supports and thermostat, see FIG. 2 thereof.

U.S. Pat. No. 6,020,577 to Barker discloses another heater assembly that starts with a larger sheet that has much material removed, then repurposed and folded into a related structure used for the element support structure. This heater assembly also allows for multiple coils to be attached. However, many additional components are required to complete the entire heater assembly, e.g., more parts required and more assembly needed to supply a means for attaching the terminal ceramic supports, thermostats, mounting brackets, etc., see FIG. 2 thereof. Another problem with this kind of heater is that it is only suitable for air flow that is parallel to the coil support rack. It cannot be used in a situation where air would flow through the coil support rack as there is insufficient space or passageways for the air to flow.

U.S. Pat. No. 6,087,639 to Engelke et al. shows a retainer bracket or a single support rack for a heater assembly. This rack allows the open coil heating element to pass through openings in the rack in a string through style. This heater assembly is also specifically designed to heat air flowing parallel to the rack surface or an air flow over configuration, not perpendicular to the rack surface. There is no disclosure of the retainer bracket having additional features or structure allowing mounting of other heater components.

Pre-Grant Publication No. 2008/0173636 to Kutz is another example of the use of a large sheet to form a heater support rack. While forming this rack results in a lot of waste of material due to the rack central opening, this waste is mandated by the functionality of the rack itself. Also, adding additional coil elements to the rack is problematic and other parts requiring fabrication and assembly would be required and this is shown in FIGS. 10 and 11 of Kutz. It should be noted that in Kutz, the intended air flow is perpendicular to the surface or face of the rack and the rack configuration is not designed to allow air flow over the face of the rack or parallel thereto.

U.S. Pat. No. 4,528,441 to Seal et al. is another example of a heater rack that supports open coil resistance elements. Seal et al. teaches the use of a mounting bar 6 that employs a cross bar 5, wherein the cross bar 5 connects to a ceramic support that holds the open coil resistance element, see FIG. 1. However, a basic failing here is that it does not leave room for the contemplation of providing a much wider part, so as to include more and more coils over a broader airflow width, which is typical for larger heat kits often found in residential AHU's and the like. This type of assembly is common and is often referred to in the field as a shish kebab heater rack and often is supplied with a max. Kw of around 5.0 to 6.0. This means that multiple versions of this assembly are needed used for a final and complete assembly, which can supply a most typical maximum total Kw of around 20.0. This also means that, typically, the assembly may need around 20/5=4 total coil sets or shish kebab rack assemblies for final completion. While Seal et al. does not illustrate a larger assembly, it would require more and more parts for the final product. Another problem with Seal et al. is that if the design were simply made wider, the ceramic coil support twist mechanism labeled 7 could not continue on with the width of the parts and allow another ceramic support to be attached due to interference. Also, attempting to link the mounting bars together with connecting structure can result in clearance and short circuit problems as coils could sag where they cross the connecting structure.

Another example of a shish-kebab heater is shown in U.S. Pat. No. 6,376,814 to Holmes. Holmes uses a pinch tine technique to support the ceramic insulators on the cross bars but suffers from the same drawbacks as Seal et al. in terms of finding ways to support more coils without having to add additional structure. The heater of Seal et al. is constrained to basically 4 rows of coils, two upper and two lower. Also, with the pinch tine technique, there has to be tool access to the tines when securing the ceramic supports. Having this tool access limits where the tines can be placed on a given rack and constrains the ability to increase the number of coils held by a particular rack.

U.S. Pat. Nos. 6,433,318 and 6,660,141 to Danko et al. are also examples of prior art heater racks that require a number of additional structural features and components to complete a heater assembly.

FIGS. 1 and 2 shows a portion of another prior art heater rack that is designated by the reference numeral 10. The rack portion 10 has a plurality of three sets of ceramic support areas, called attachment nodes 1, 3, and 5, the attachment nodes using the tine pinch method of ceramic support attachment disclosed in Holmes. The rack portion 10 is designed to be bent so that the attachment nodes 3 and 5 are in a plane that is perpendicular to the plane of the attachment node 1. The rack portion also includes connecting arms 7 and cross arms 9. The connecting arms 7 interconnect the attachment nodes 1, 3, and 5 with the cross arms 9 connecting the cross arms 7 together. Although not shown, the rack portion 10 would ultimately terminate with end portions that link to the connecting arms 7.

FIG. 2 depicts a heater rack portion assembly including the rack portion 10 of FIG. 1, ceramic supports 11 and open coil resistance elements or coils 13. The rack portion 10 of FIG. 1 is bent along the line X-X of FIG. 1. In the bent condition, the attachment nodes 3 and 5 lie in a plane perpendicular to a plane that contains the attachment node 1. Each attachment node 1, 3, and 5 includes a ceramic support 11. As is known in the art, ceramic supports are configured to both attach to a heater rack and a coil so as to support the coil and maintain a separation between the coil and heater rack to avoid short circuiting of the heater assembly.

An example of an arrangement of a ceramic support 11' and a coil 13 is shown in FIG. 3. The ceramic support 11' has end portions 15 that are configured to engage the coil portion 17 of the coil 13. The ceramic support 11' also includes a narrowed center portion or a slot 19, which is configured to attach to a part of a heater rack. It should be understood that ceramic supports can have any number of configurations to attach to a heater rack. As noted above, the Holmes patent shows a pinch tine type attachment, wherein the heater rack attachment nodes are designed to expand to receive a center portion of the ceramic point in a slot in the attachment node and then pinch back to hold the ceramic support in place.

Referring back to FIG. 2, in the bent configuration, the heater rack portion 10 can hold six coils 13, with three of the coils shown in FIG. 2 by dashed lines. Two coils use attachment nodes 1 and its ceramic supports 11 and four coils use attachment nodes 3 and 5 and their respective ceramic supports 11. A problem with this design is illustrated by the "*" or star marks in FIG. 2. The star marks represent surfaces on the rack portion 10 that can come into contact with one of the coils 13 if that coil should sag and cause a short circuit.

The short circuiting problem above could be avoided by using a rack portion 10' with just two attachment nodes as shown in FIG. 4, but this suffers from the limitation of only using two ceramic supports 11, which only support four coils. Rack portion 10" in FIG. 5 suffers from the same sag and short circuiting issues shown in FIG. 2 at the "x" at locations 21. The attachment nodes 23 in FIG. 5 also present a problem in terms of access to the attachment nodes when using the pinch tine method of Holmes on the rack to attach to the ceramic support. This method of attachment requires tooled access to the tines on the rack end zones 25 in the FIG. 5 arrangement are not easily accessed by tools to attach the ceramic support 11 to the attachment node 23.

Another problem with prior art heaters is that they are not configured to be used regardless of whether air is flowing parallel to the plane of the heater rack holding the coils, which is called air flow over, or air is flowing perpendicular to the plane of the heater rack, which is called air flow through.

With reference now to FIGS. 6 and 7, FIG. 6 shows a schematic of a clothes dryer designated by the reference numeral 30. The clothes dryer includes a heater 31. The heater 31 includes a heater rack 33, a number of ceramic supports 35 and coils 37. The air flow through the clothes dryer 30 is also depicted with various arrows in FIG. 6. It can be seen that the air flows over the heater rack 30 for heating purposes and then flows to the clothes drum 39 for clothes drying.

The heater rack 33 is shown in more detail in FIG. 7. It can be seen from this drawing that the heater rack 33 has few through openings and air flow through the rack would be insufficient for heating purposes and a risk of overheating of the heater would exist. Thus, the heater rack 33 could not be used in an application that required flow through the rack for heating purposes or in the flow through direction that is x'd out in FIG. 7.

With the requirement that prior art rack designs use multiple components to form a heater assembly, the inability for prior art heater racks to support larger numbers of coils without risking short circuiting by having structure close to the coils, the excessive waste encounters from sheet material when forming the racks, having special tooling access to assemble the heater, and the inability for heater racks to accommodate both air flow over and air flow through applications, a need exists for an improved heat rack design that allows, for example, for the use of multiple coils without the need for extra parts while minimizing the risk of short circuiting, less waste, and easier assembly. The present invention responds to this need by providing a unique open coil resistance element heater rack.

SUMMARY OF THE INVENTION

One object of the invention is a one-piece heater rack that is designed to support open type coil electrical resistance heater elements using ceramic supports.

Another object of the invention is to provide the one-piece heater rack in a configuration that allows the heater rack not only to retain the ceramic supports but do so in a way that makes it easy to connect the ceramic supports to the heater rack.

Yet another object of the invention is to provide a heater rack that can be configured to accept other heater components and allow the heater rack to be configured for purposes of increasing its strength, allowing the heater rack to be used in situations where air flow would be either over the rack or through the rack, include features in the heater rack to enhance air flow control, and all without the need for the use of additional components, welding steps, fastening steps, and the like.

Other objects and advantages will become apparent as a description of the invention proceeds.

In satisfaction of the foregoing objects and advantages of the invention, the invention is an improvement in heater racks that are used in heater assemblies and comprises a single sheet of material having a front side and a back side. The single sheet of material further comprises a peripheral structure, and a plurality of arrays of attachment nodes. Each attachment node is configured to secure at least one ceramic support to the attachment node, the attachment nodes extending between portions of the peripheral structure. In order to attach the ceramic supports to the heater rack, each attachment node has a peripheral portion that forms a first opening configured to allow a ceramic support to be positioned in the opening from either the front side or the back side. The peripheral portion also forms a second opening that is configured to receive a central portion of the ceramic support by either sliding or twisting of the ceramic support. The attachment node also includes a tab extending into the opening to retain the ceramic support in the opening by tab bending.

While the heater rack could function with just the array of attachment nodes, it can also include at least one plate member. The at least one plate member can be part of the peripheral structure, be positioned between adjacent attachment nodes of a given array, or be positioned between adjacent attachment node arrays. In another embodiment, two or more plate members can be provided and used as both part of the peripheral structure and between adjacent attachment node arrays. The at least one plate member can have one or more openings therein to provide different functionality for the heater rack. These functionalities include facilitating the mounting of various heater components like thermostats, temperature limit switches, temperature cut off device, terminals and other known heating assembly components. Other functionalities include configuring the plate member to assist in control of air flow over or through the one-piece heater rack and providing a bending or folding capability to the plate member for component mounting purposes and the like. Other parts of the peripheral structure can be bent as well for strength enhancement, creating channels for wiring for radiant heat protection and the like.

The attachment nodes can be positioned in the arrays in any number of ways, including both an even spacing between attachment nodes in a given array or uneven spacing in the array. This ability to provide different spacings between the attachment nodes allows the heater rack to create different configurations for the coil being supported thereby. The attachment nodes can also vary in size to handle different sized and types of ceramic supports and coils.

The arrays of attachment nodes include a connecting arms positioned between adjacent attachments nodes in a given array. The width of the connecting arm relative to the width of the attachment node can vary such that the connecting arm could have a width smaller, larger, or the same as the attachment node. Having a larger width for the connecting arm improves the overall strength of the heater rack.

Another feature of the inventive heater rack, while using a large number of ceramic supports and extensive coil rungs, is minimizing the chances of a short circuit due to the coil sagging and contacting a part of the heater rack. That, the adjacent second openings in the attachment nodes that would function to support a coil in a direction that aligns with the second openings are separated by an open space. The adjacent second openings could be part of an array of attachment nodes or second openings in adjacent arrays of attachment nodes. In either case, the adjacent second openings are separated by an open space that does not contain any structure of the one-piece heater rack. With this open space, if a coil segment between two ceramic supports and adjacent attachment nodes were to sag, there would be no structure for the sagging coil segment to contact and cause a short circuit in the heater assembly.

Another aspect of the invention is the ability of the attachment nodes to hold more than one ceramic support. The attachment node could be configured with at least two second openings to support a pair of ceramic supports. The two openings could be combined with the first opening so that the same opening could be used to insert the ceramic supports into the respective second openings. Alternatively, the attachment node could have two first openings and two second opening to accommodate a pair of ceramic supports.

It is conceivable that additional openings could be formed in the attachment nodes to hold even more ceramic supports.

For the sliding attachment of the ceramic supports to the attachment nodes, the second opening is in the form of a slot adjacent to the first opening. The slot is adapted to slidably receive a central portion of the ceramic support for securement to the attachment node. For the twisting attachment of the ceramic support, the second opening is in the form of a pair of cut-outs in opposing edges of the first opening, the pair of cut-outs receiving a central portion of the ceramic support upon twisting of the ceramic support.

The arrays of attachment nodes can have any number of orientations for the heater rack. The arrays could be aligned in a parallel fashion. Alternatively, additional connecting aims could be provided so that the arrays not only run in one direction, but arrays of attachment nodes are formed that run perpendicular to those aligned in parallel.

The flexibility of the heater rack and creating the attachment nodes from a single sheet of material also allows the placement of the attachment nodes in one of more of the arrays to be oriented or angled with respect to the array direction so that a coil so mounted to ceramic supports held in the angled attachment nodes would follow a non-linear path.

Regarding the peripheral structure of the heater rack, in some embodiments, the peripheral structure would be connected together peripheral members that would surround the array of attachment nodes. In other embodiments, one or more plate members could function as part of the peripheral structure. In yet another embodiment, an array of attachment nodes and connecting arms could act as one of the peripheral members of the heater rack.

The plurality of arrays of attachment nodes could be provided in sets that are separated by a plate section. The plate section could be bendable along two spaced apart lines extending along the plate section. The plate section could be bent along the two spaced apart lines so that the two sets of plurality of arrays of attachment nodes would be parallel to each other after bending. In effect, the heater rack would become u-shaped with one end of the u-shape having one heater assembly of coils and ceramic supports and the other end of the u-shape having a second heater assembly of similar construction.

The invention also encompasses a heater assembly that uses the inventive heater rack in combination a plurality of ceramic supports connected to the attachment nodes and one or more coils connected to the ceramic supports.

The heater assembly using the inventive heater rack can be used in virtually any application that requires heating of a desired space. This heater assembly could be used to heat air flowing in a duct for a living space, a clothes dryer, space heaters, and the like. The method of use would simply involve placing the heater assembly in the desired location and supplying power to the heater assembly to generate the desired heating using the coils.

BRIEF DESCRIPTION OF THE INVENTION

Figure 8A:
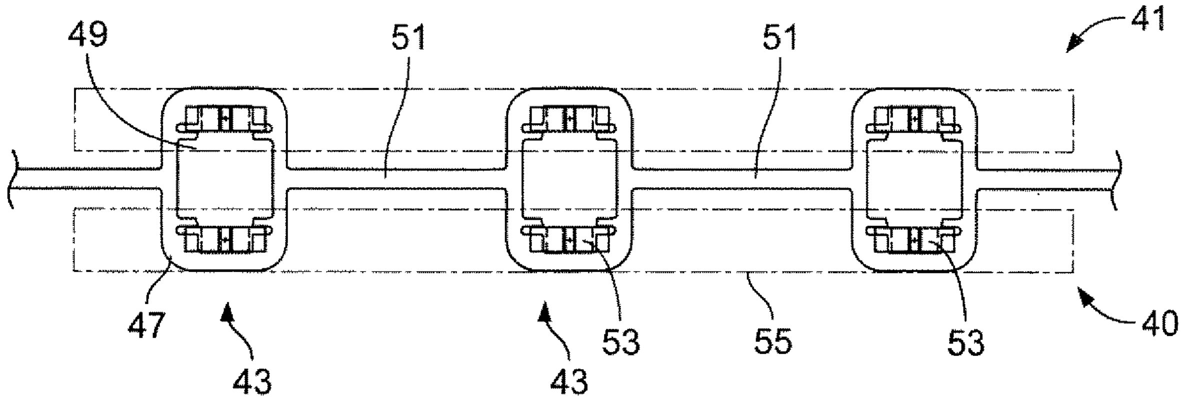

FIG. 8*a* shows a first embodiment of the invention as a part of a heater rack showing a number of ceramic support attachment nodes.

Figure 8B:
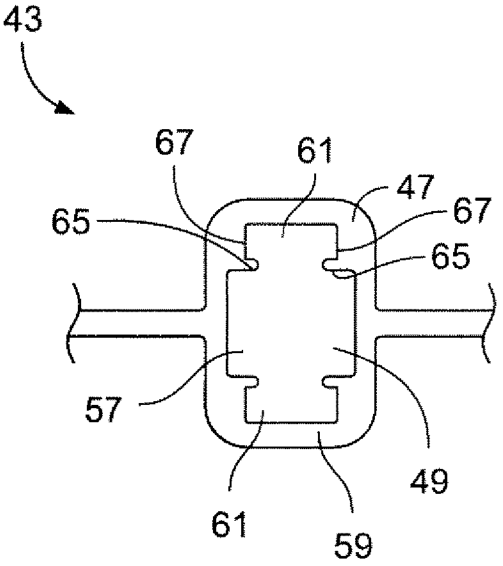

FIG. 8*b* shows an enlarged attachment node from the heater rack of FIG. 8*a*.

Figure 8C:
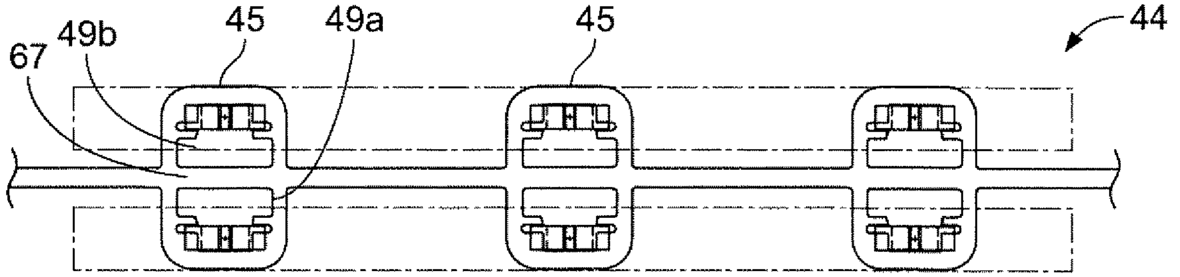

FIG. 8*c* shows a variation on the attachment node array of the heater rack of FIG. 8*a*.

Figure 9:
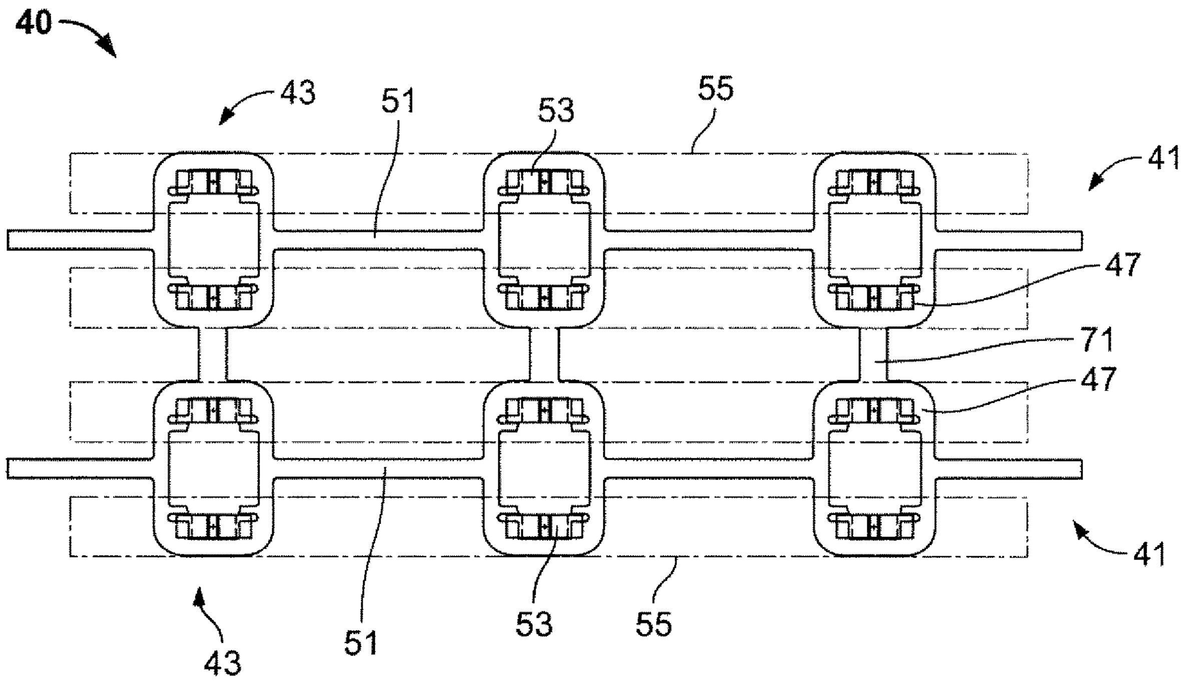

FIG. 9 shows another embodiment of the invention based on the heater rack of FIG. 8*a*.

Figure 10:
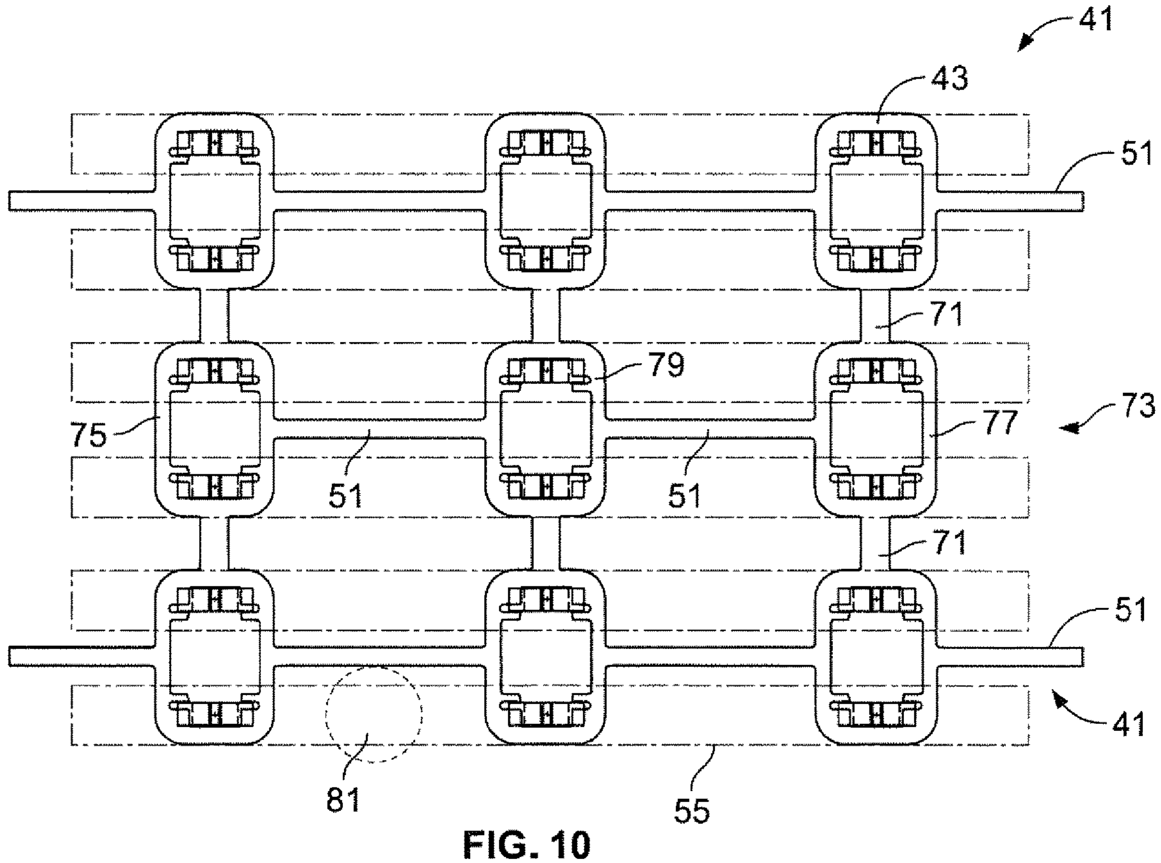

FIG. 10 shows yet another variation of the embodiment of the invention based on the heater rack of FIG. 8*a*.

Figure 11:
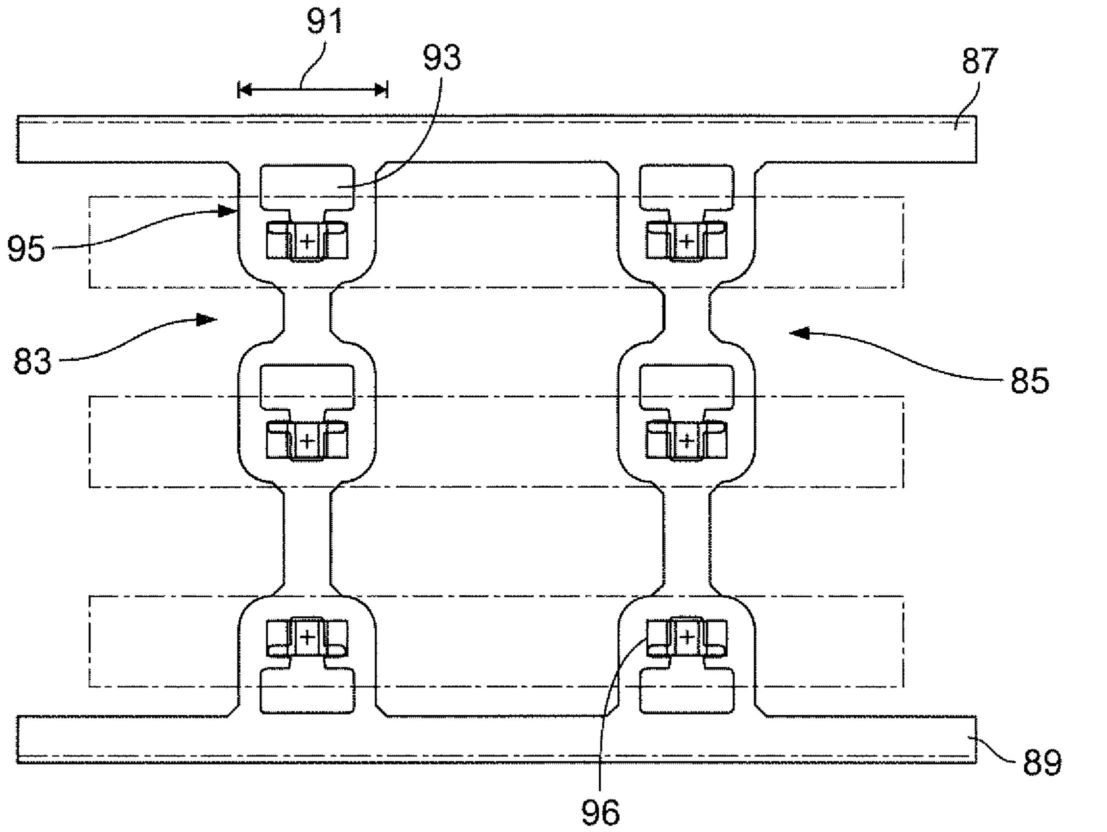

FIG. 11 shows a variation of the embodiment shown in FIG. 10.

Figure 12:
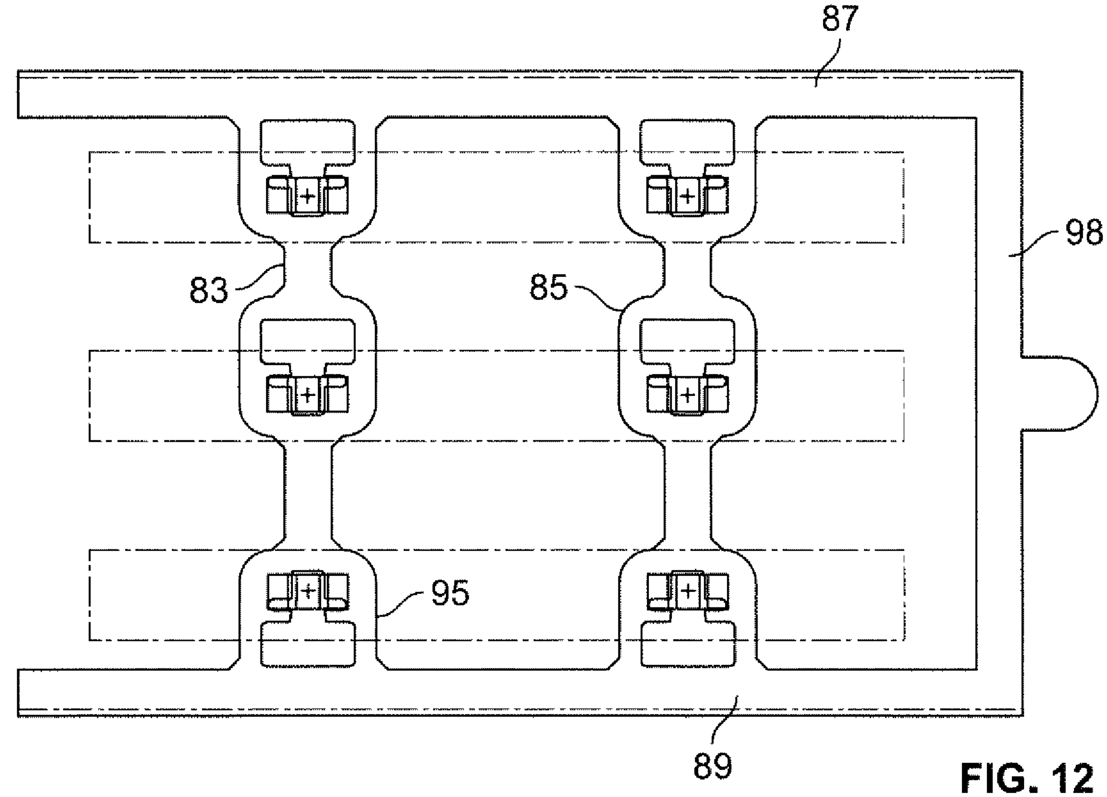

FIG. 12 shows another embodiment of the inventive heater rack portion of FIG. 11.

Figure 13B:
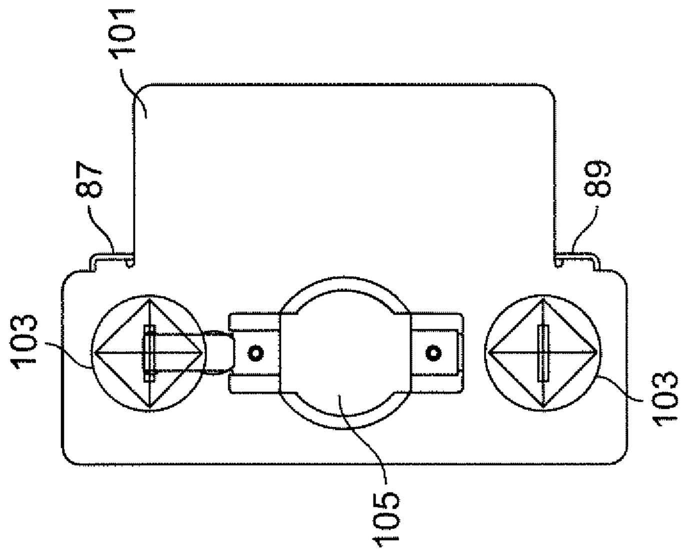
Figure 13A:
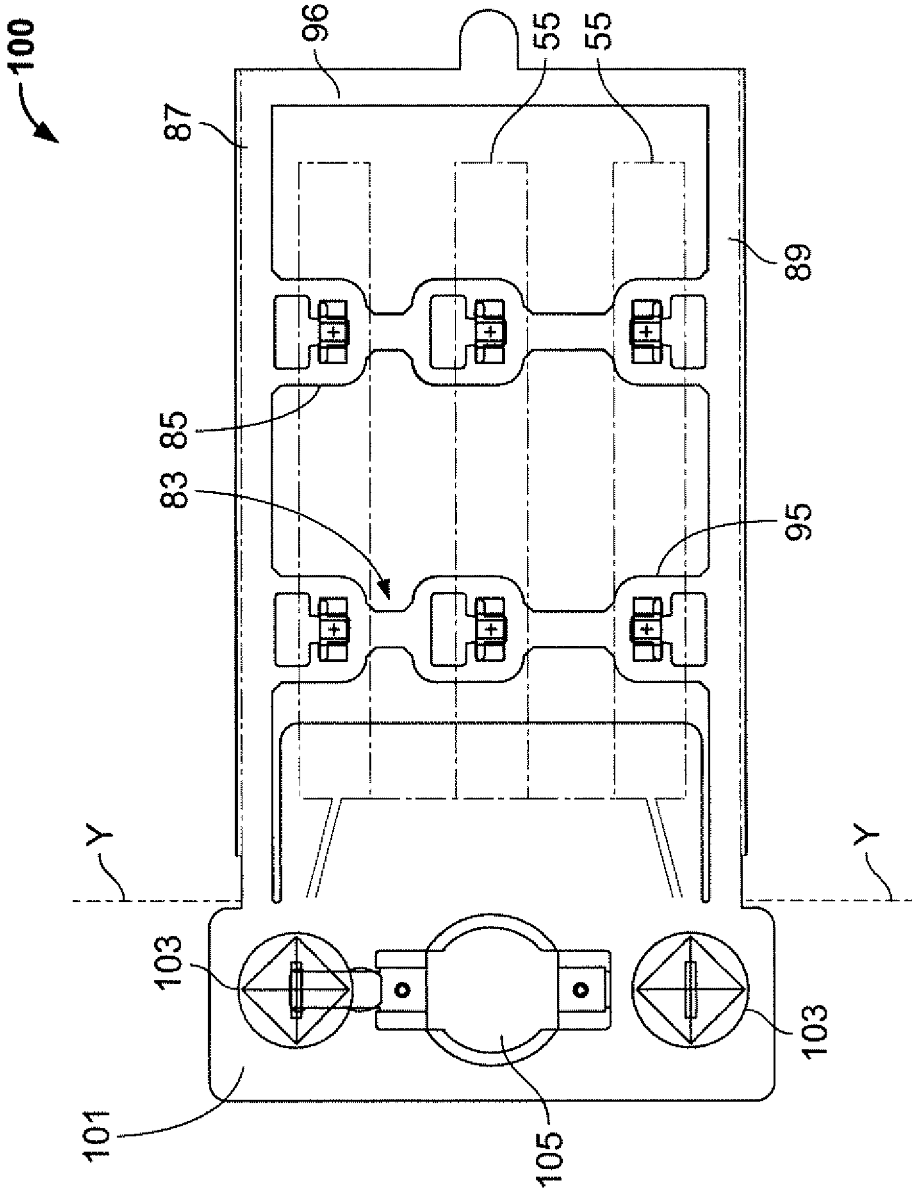

FIGS. 13*a* and 13*b* show a complete heater rack with a peripheral structure, which includes a plate member for heater component support.

Figure 14B:
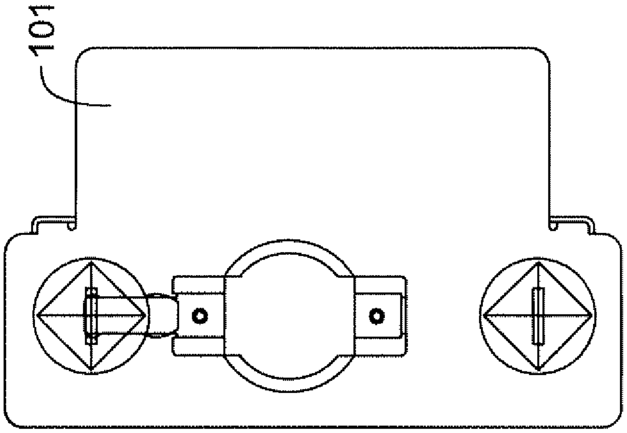
Figure 14A:
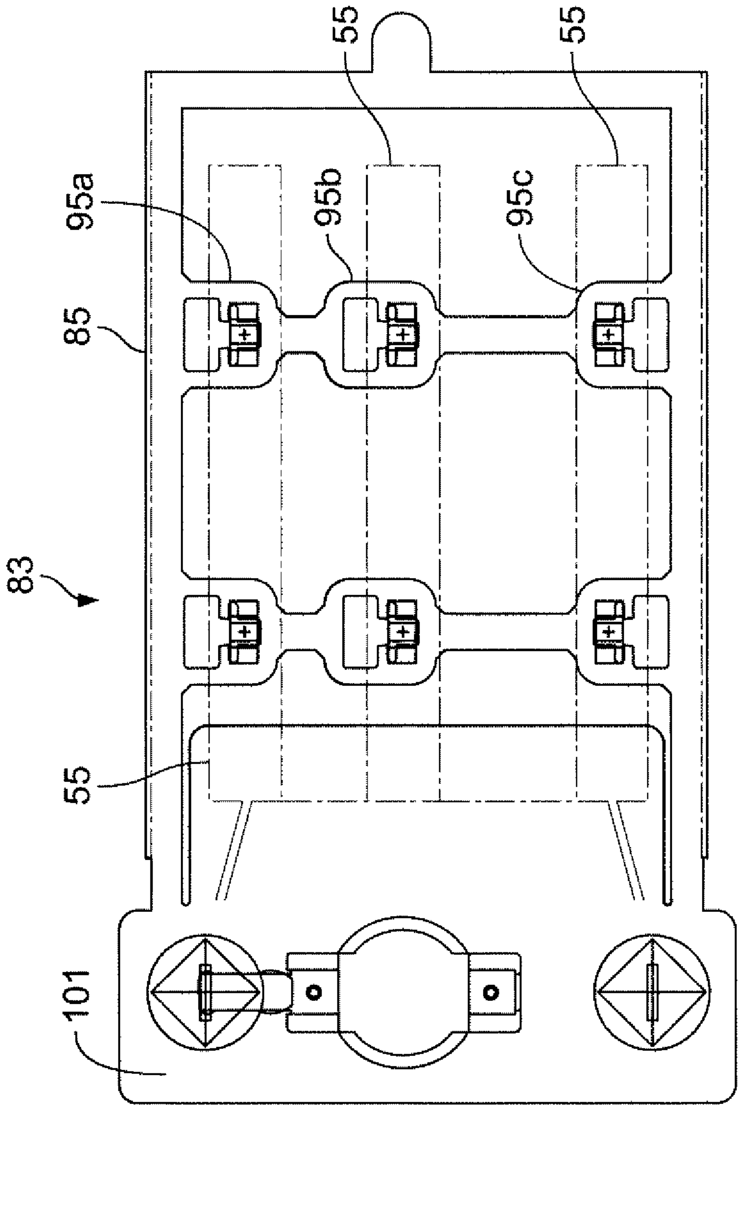

FIGS. 14*a* and 14*b* show a variation on the heater rack of FIGS. 13*a* and 13*b*.

Figure 15B:
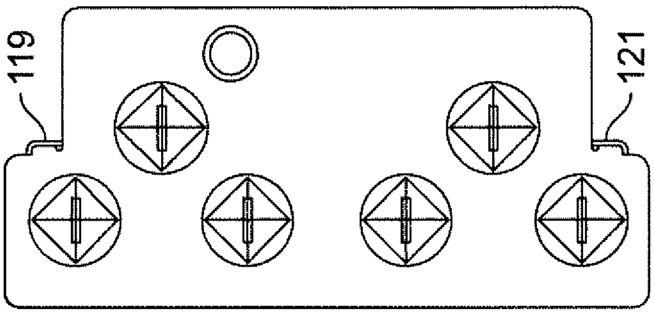
Figure 15A:
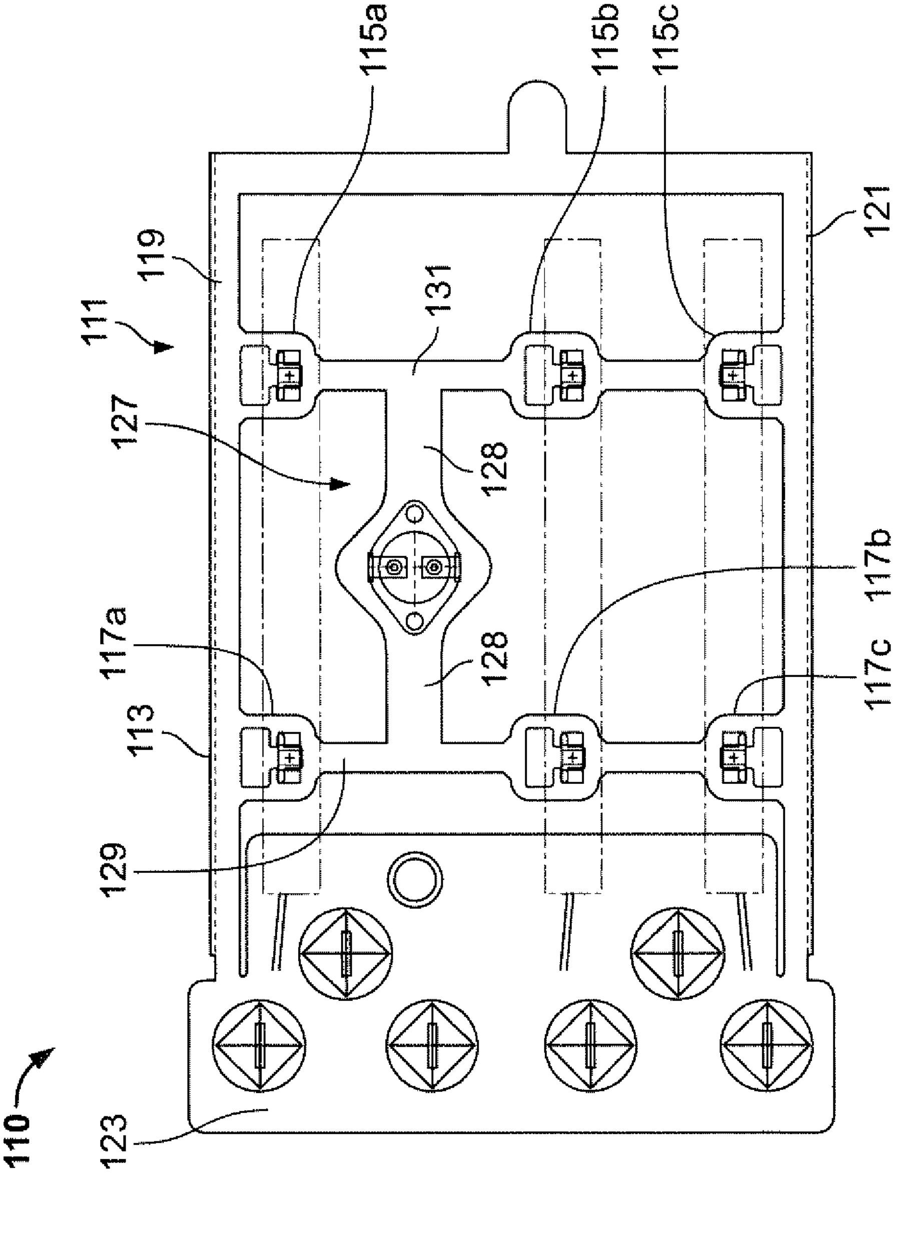

FIGS. 15*a* and 15*b* show a heater rack similar to that of FIGS. 14*a*-*b* but for the thermostat mounting location.

Figure 16B:
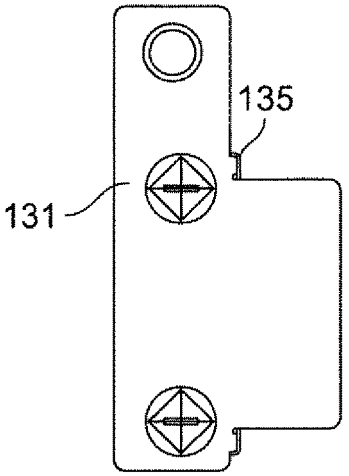
Figure 16A:
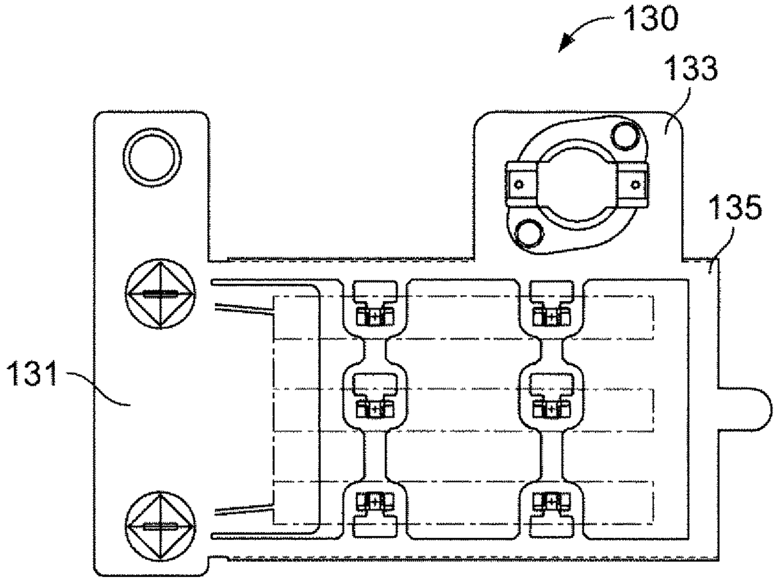

FIGS. 16*a* and 16*b* show a heater rack with an alternative thermostat mounting location as compared to FIGS. 15*a* and 15*b*.

FIGS. 17*a*-17*e* show another heater rack embodiment including a feature to accommodate heater component wiring.

Figure 18A:
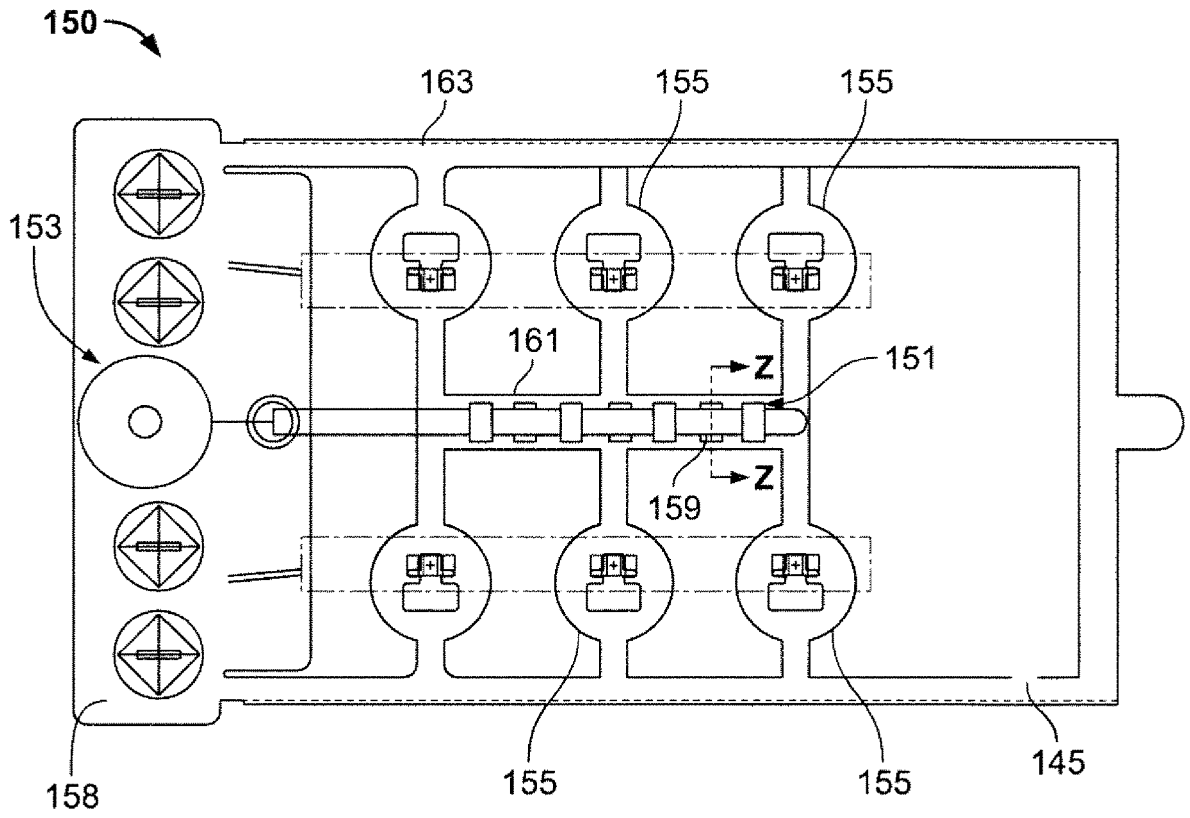
Figure 18B:
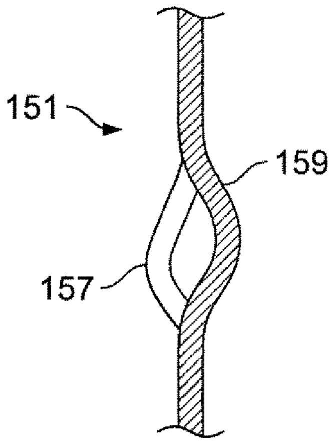

FIGS. 18*a* and 18*b* show yet another heater rack embodiment using a temperature limit device.

Figure 19:
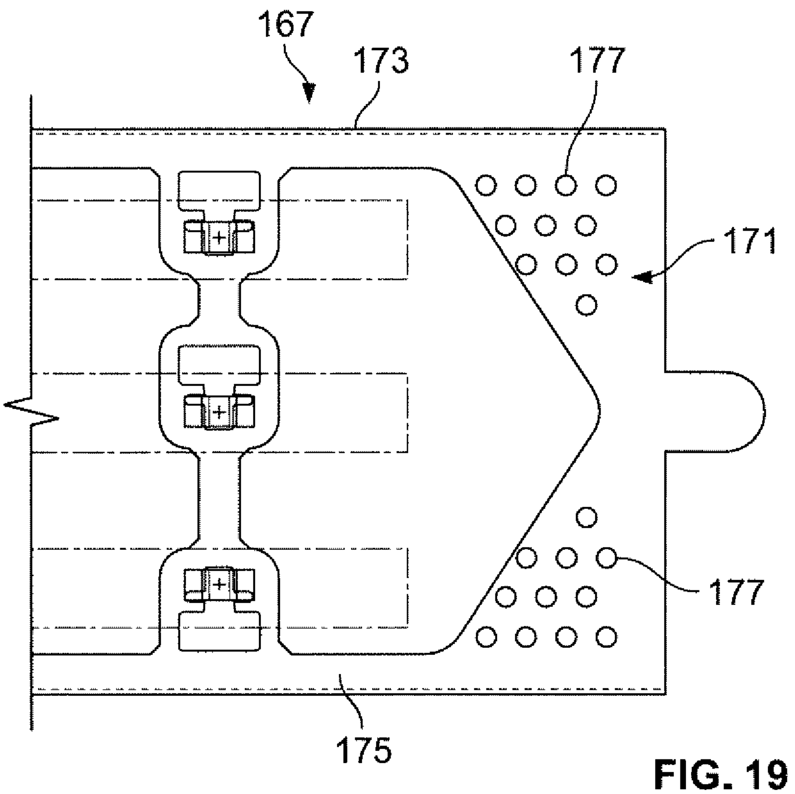

FIG. 19 shows a portion of a heater rack with a peripheral end member with air control features.

Figure 20:
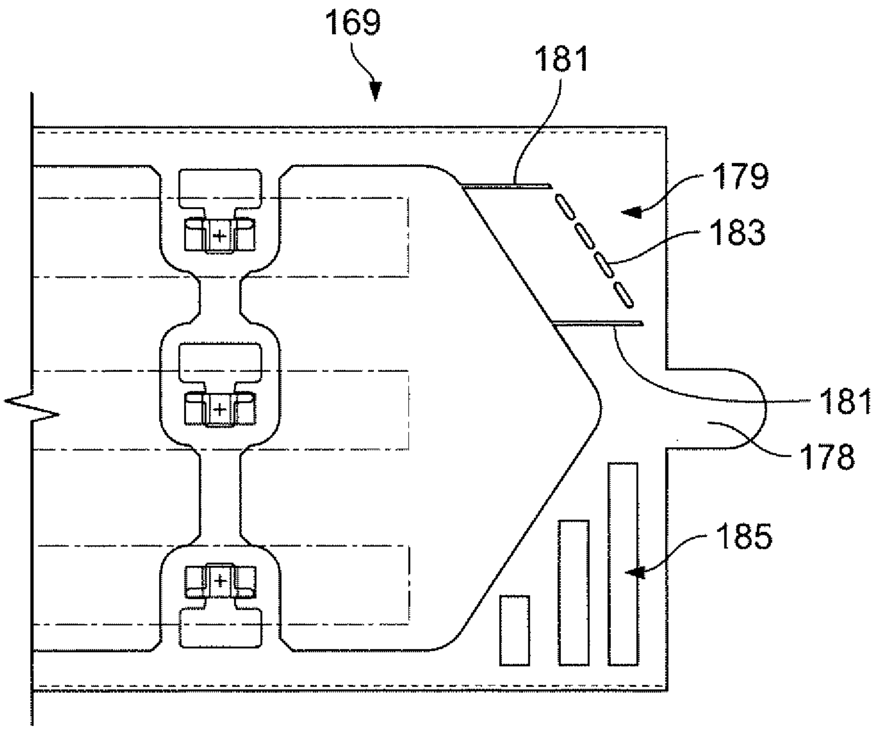

FIG. 20 shows a portion of a heater rack with a peripheral end member with other kinds of air control features than shown in FIG. 19.

Figure 21:
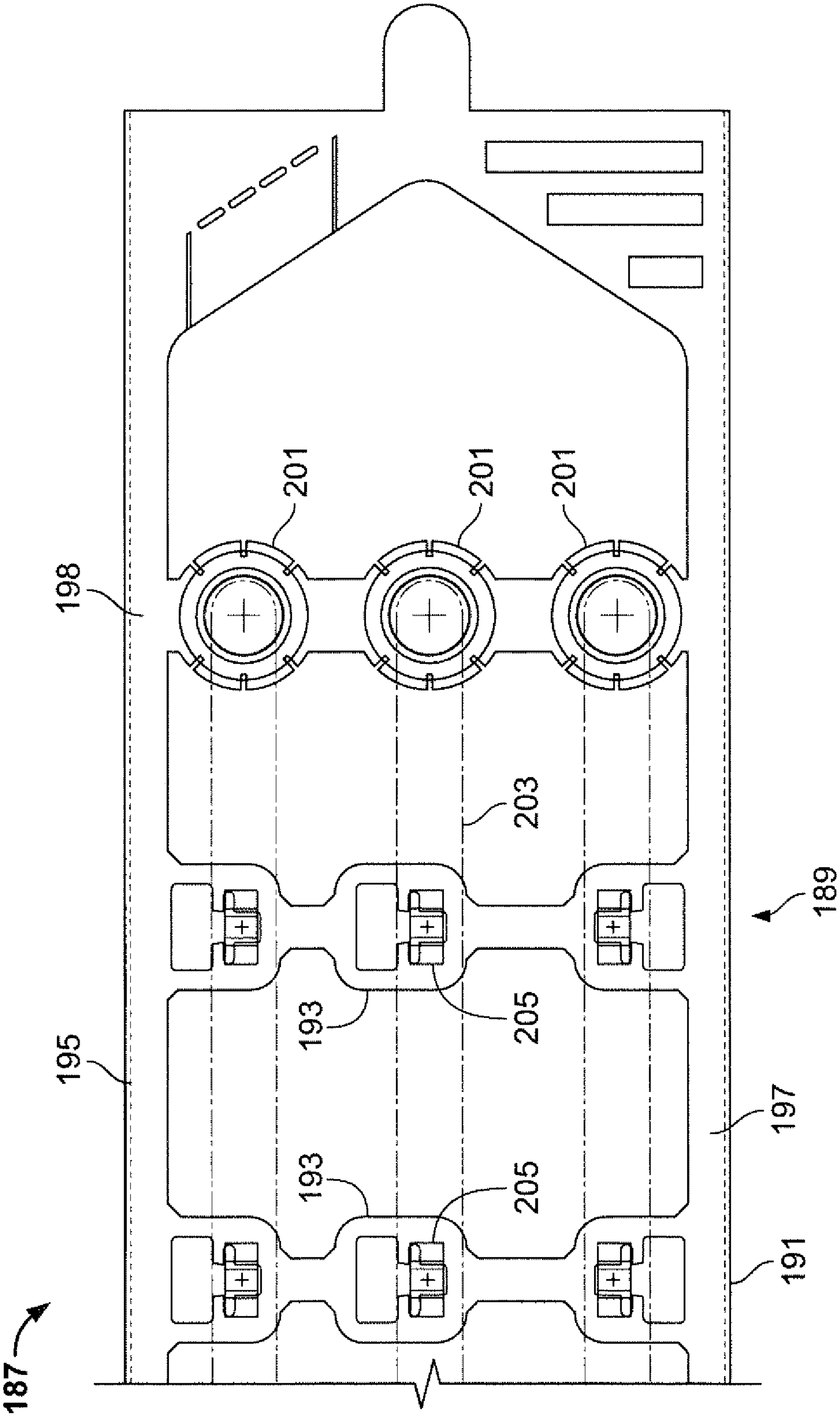

FIG. 21 shows a heater rack combining different kinds of coil ceramic supports.

Figure 22:
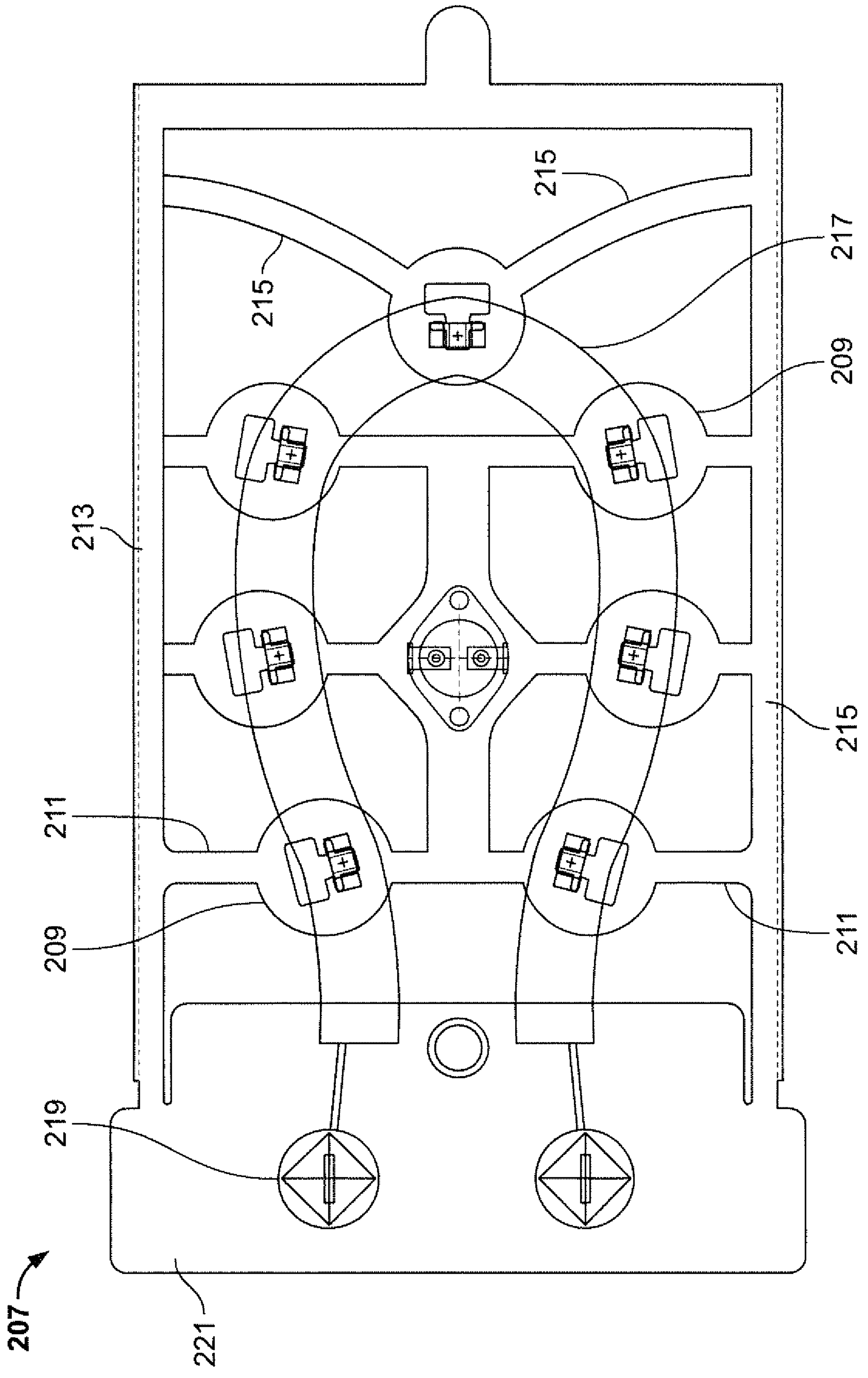

FIG. 22 shows a heater rack showing an alternative coil configuration.

Figure 23:
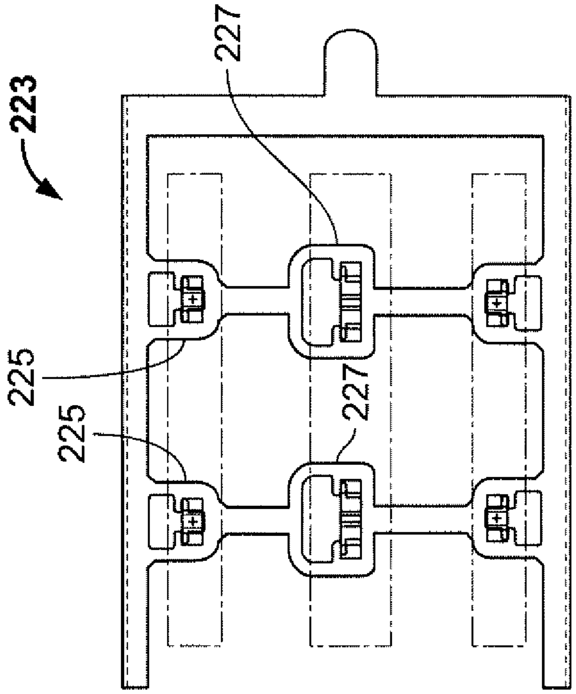

FIG. 23 shows a heater rack with different sized attachment nodes to accommodate different sized coils.

Figure 24:
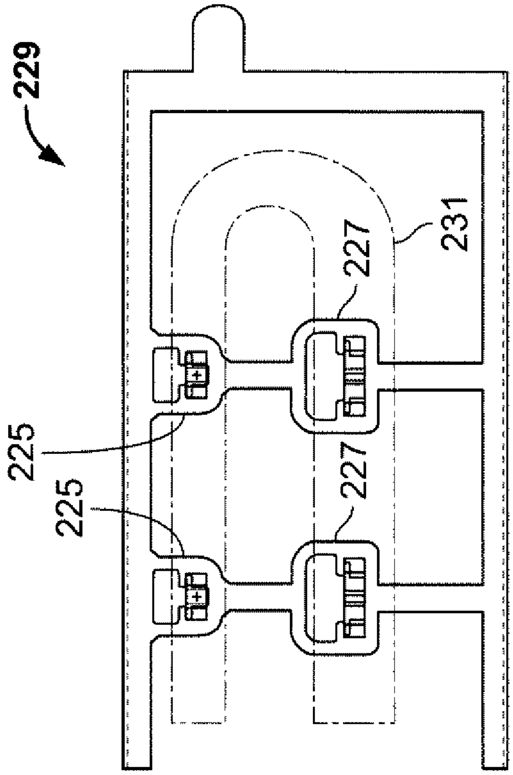

FIG. 24 shows a heater rack with different sized attachment nodes to accommodate one coil of varying size.

Figure 25A:
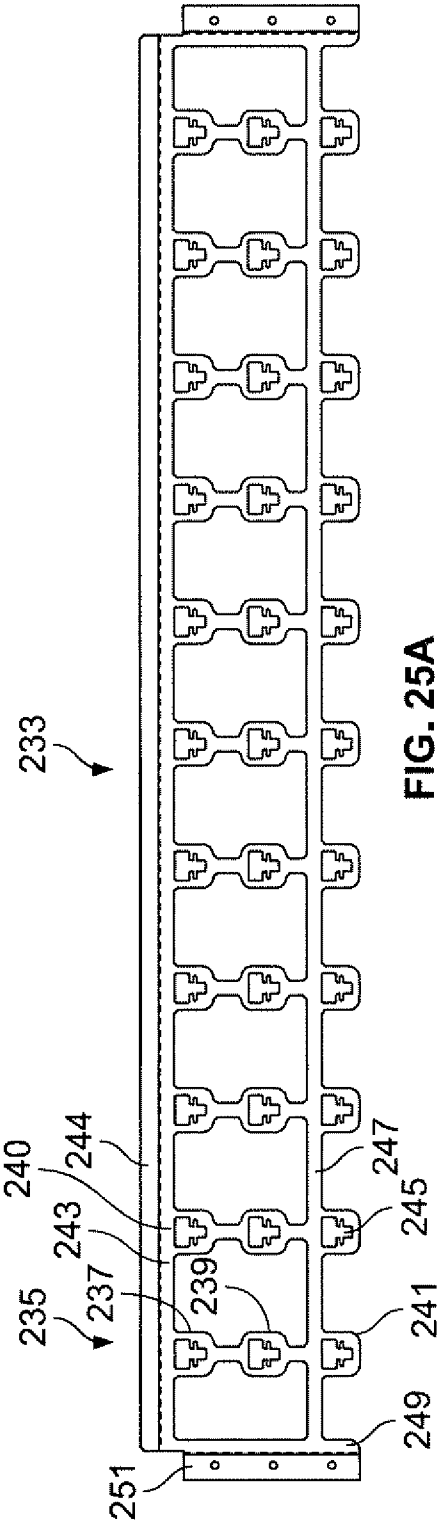
Figure 25B:
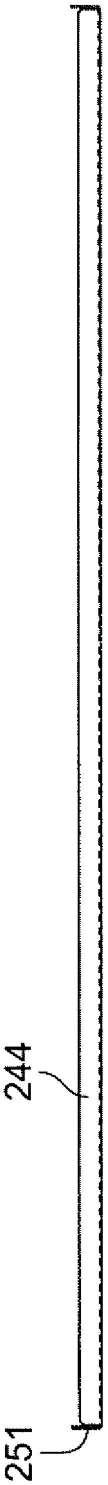
Figure 25C:
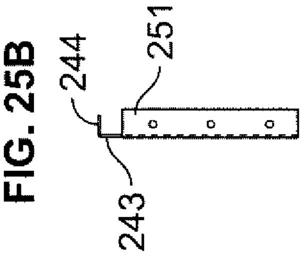

FIGS. 25*a*-25*c* show another embodiment of a less complex inventive heater rack.

Figure 26A:
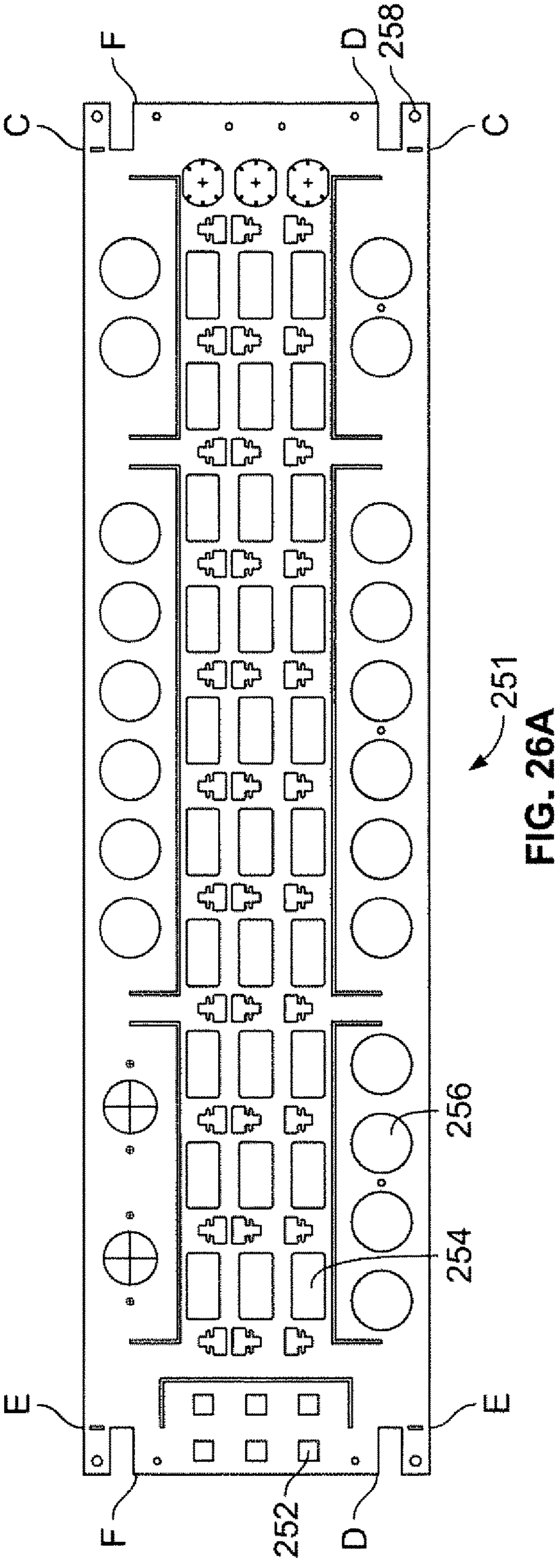
Figure 26B:
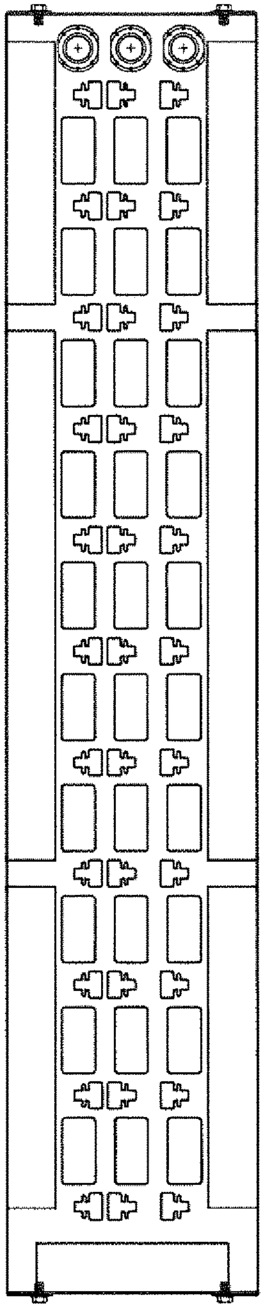
Figure 26C:
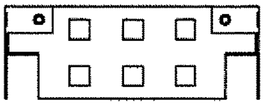

FIGS. 26*a*-*c* show another embodiment of the inventive heater rack with a more complex design.

Figure 27:
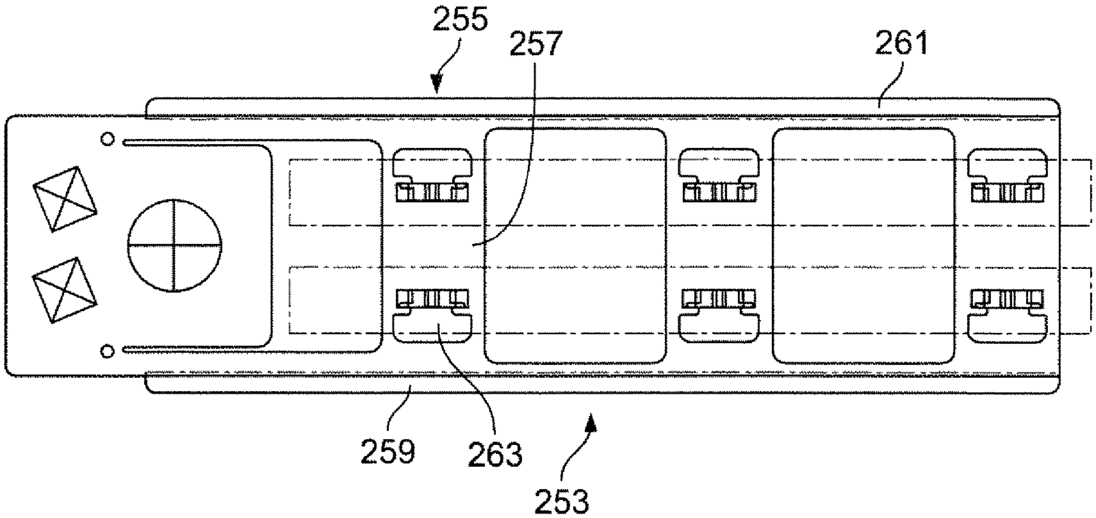

FIG. 27 shows another embodiment of the inventive heater rack with a more robust configuration for the arrays of attachment nodes.

Figure 28:
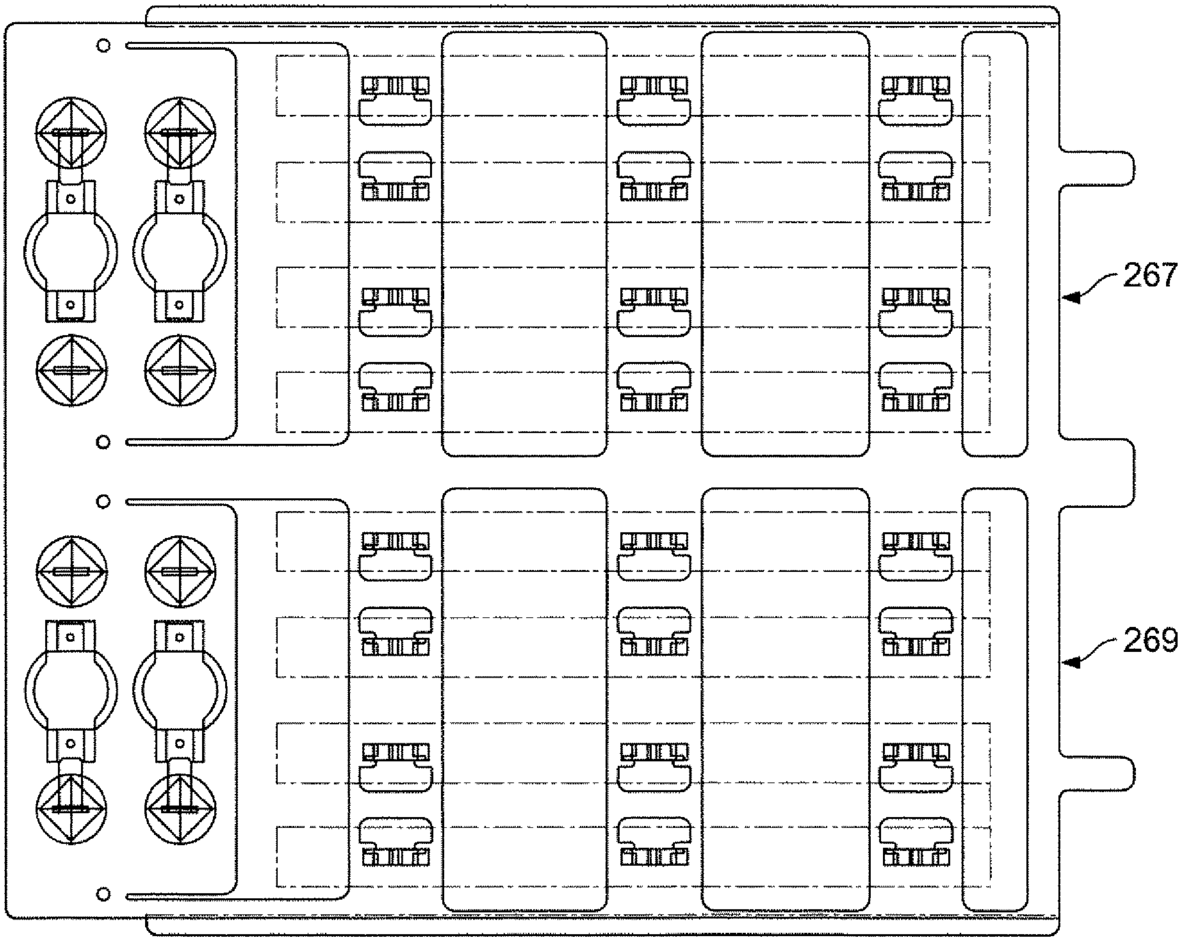

FIG. 28 shows a variation on the heater rack of FIG. 27.

Figure 29:
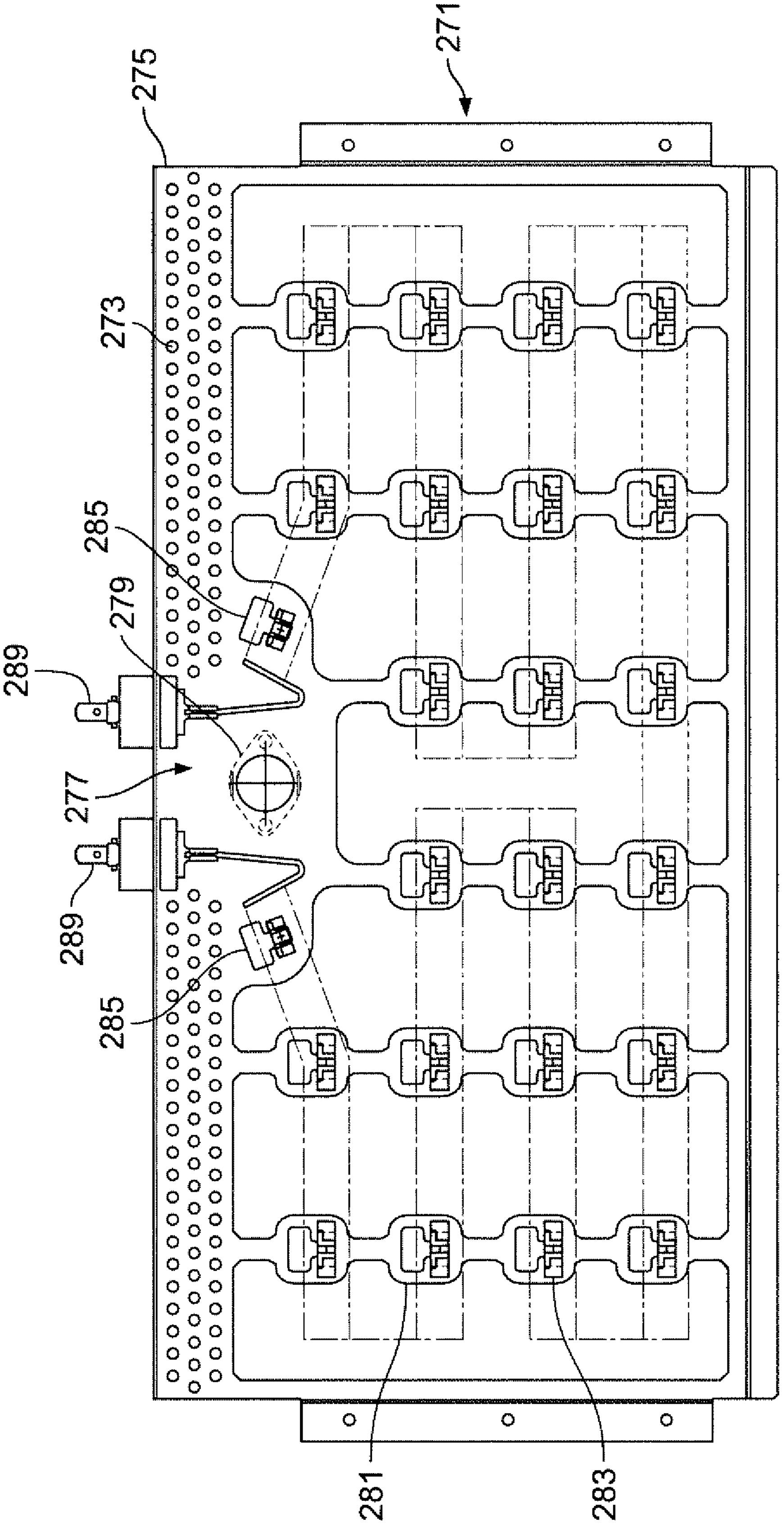

FIG. 29 shows another embodiment of the inventive heater rack with a combination of air flow control features and differently aligned attachment nodes.

Figure 30A:
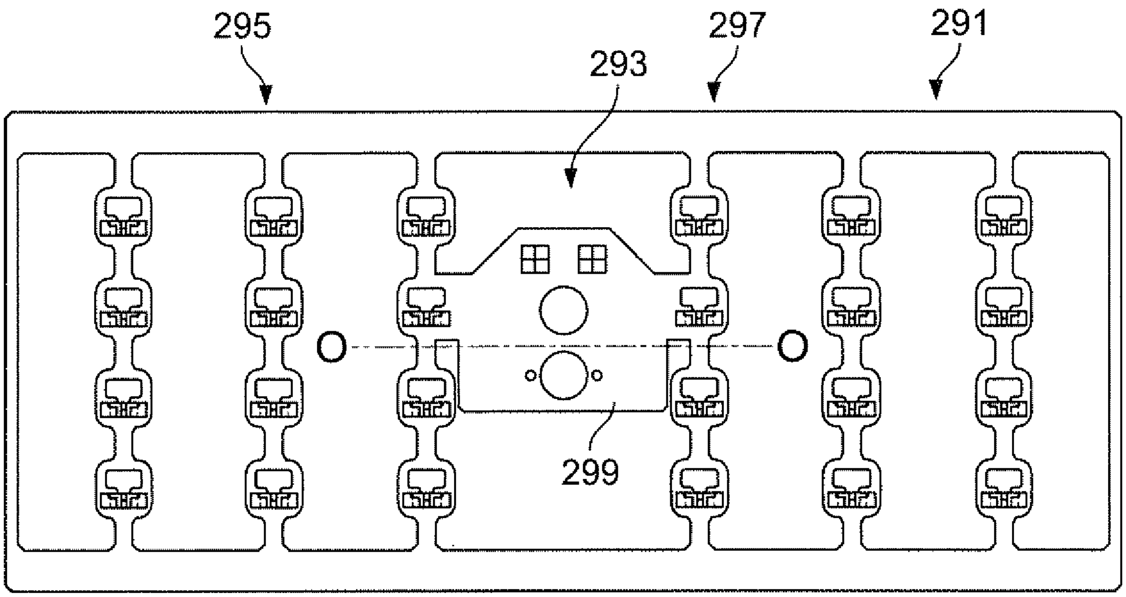
Figure 30B:
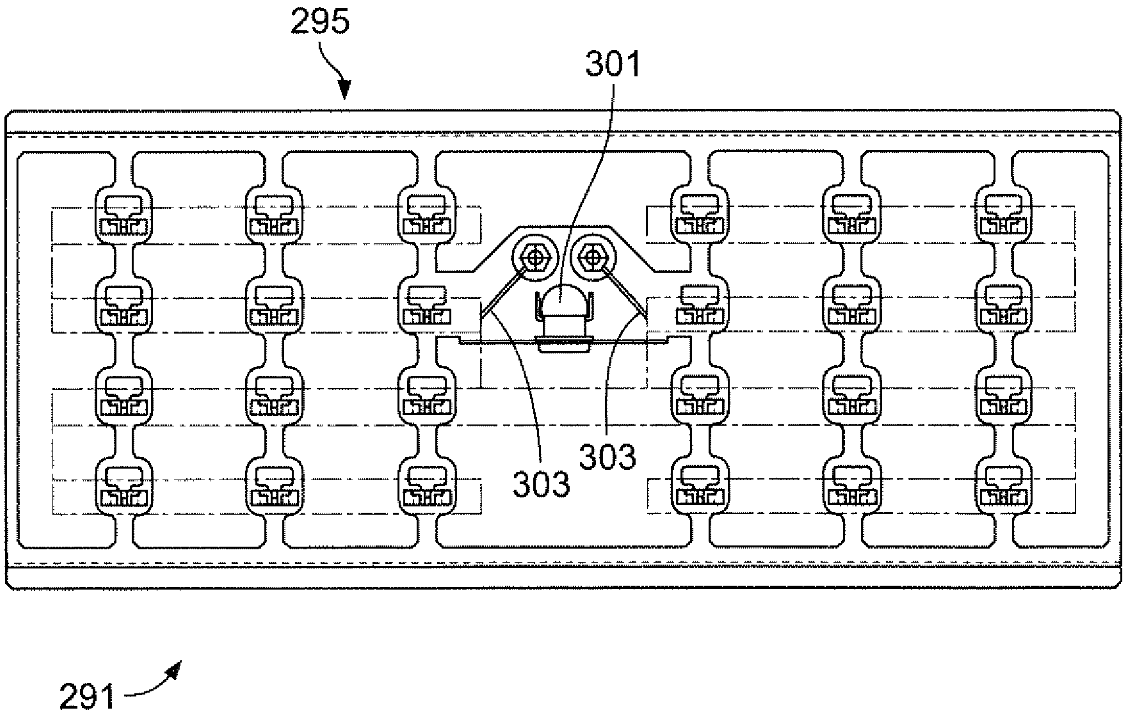

FIGS. 30*a* and 30*b* show another embodiment of the inventive heater rack with specially-mounted thermostat.

Figure 31A:
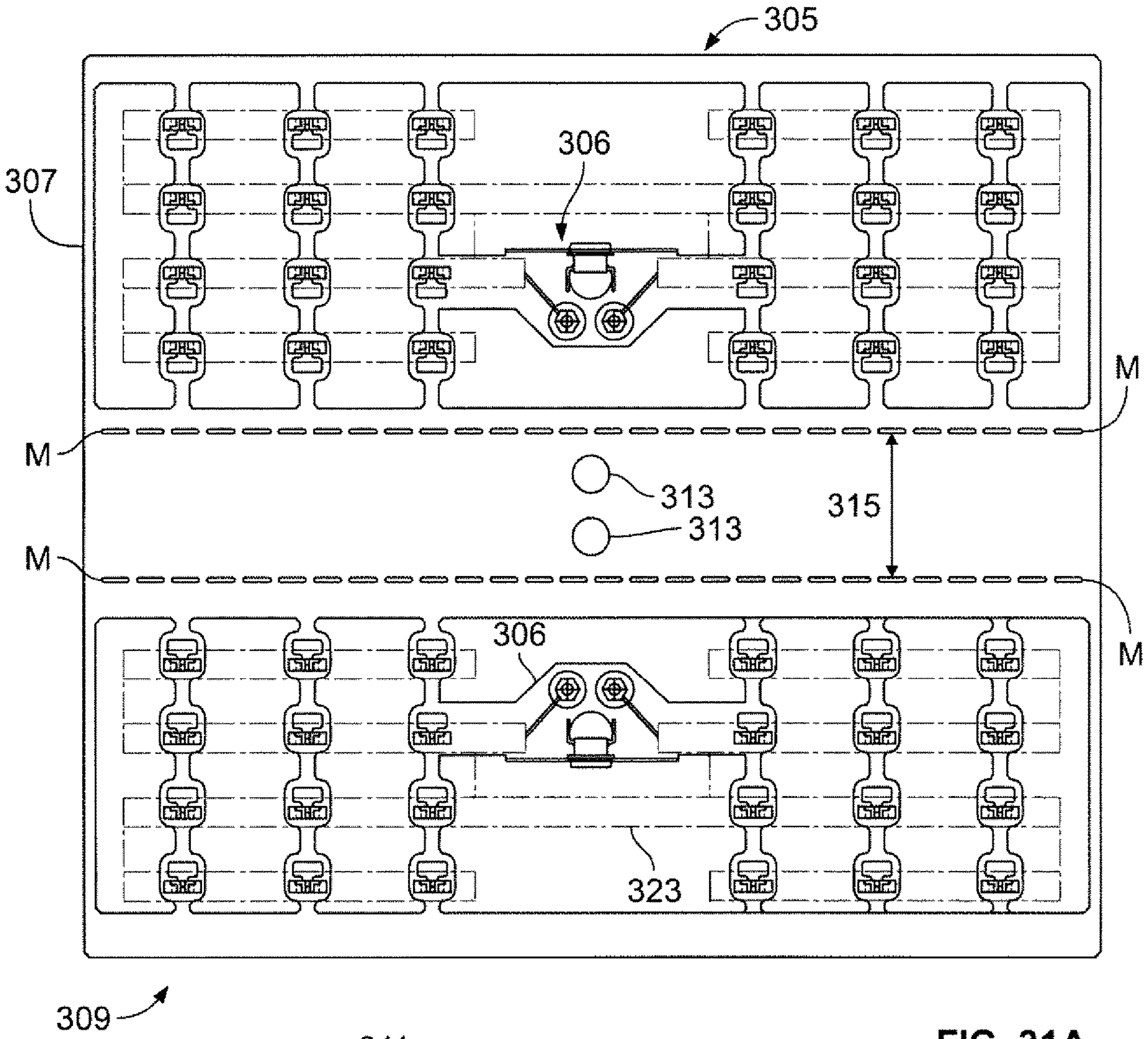
Figure 31B:
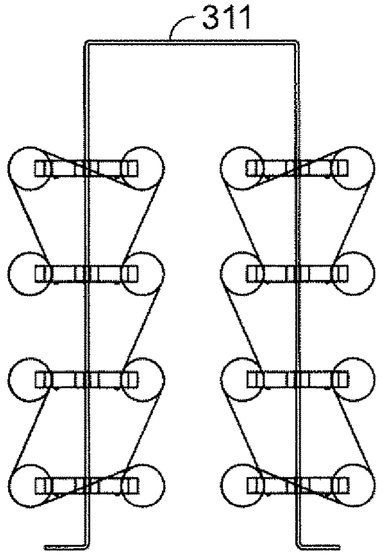

FIGS. 31*a* and 31*b* show another embodiment of the inventive rack heater with a folded configuration.

Figure 32:
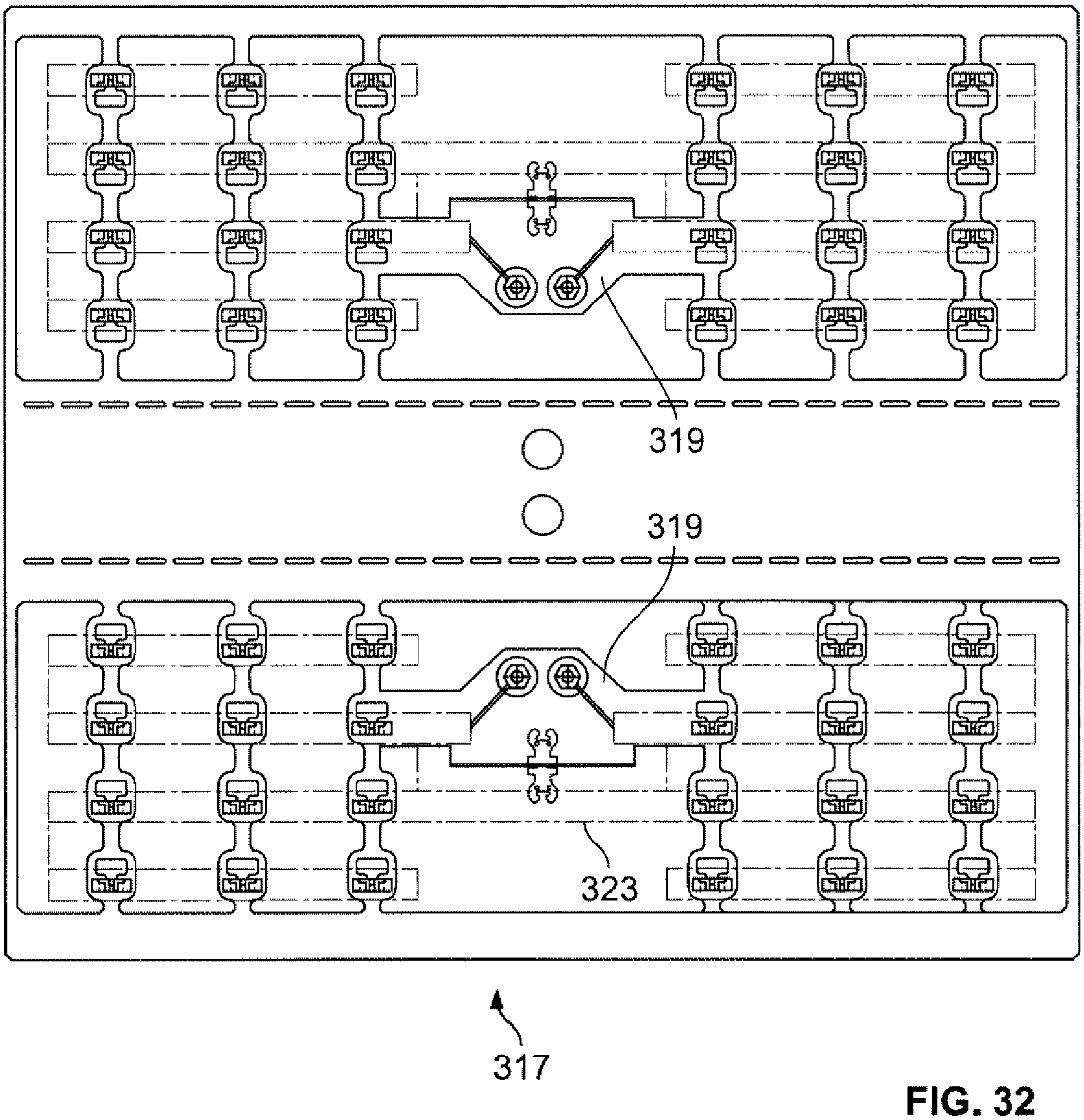

FIG. 32 shows a variation on the inventive heater rack of FIGS. 31*a* and 31*b*.

Figure 33A:
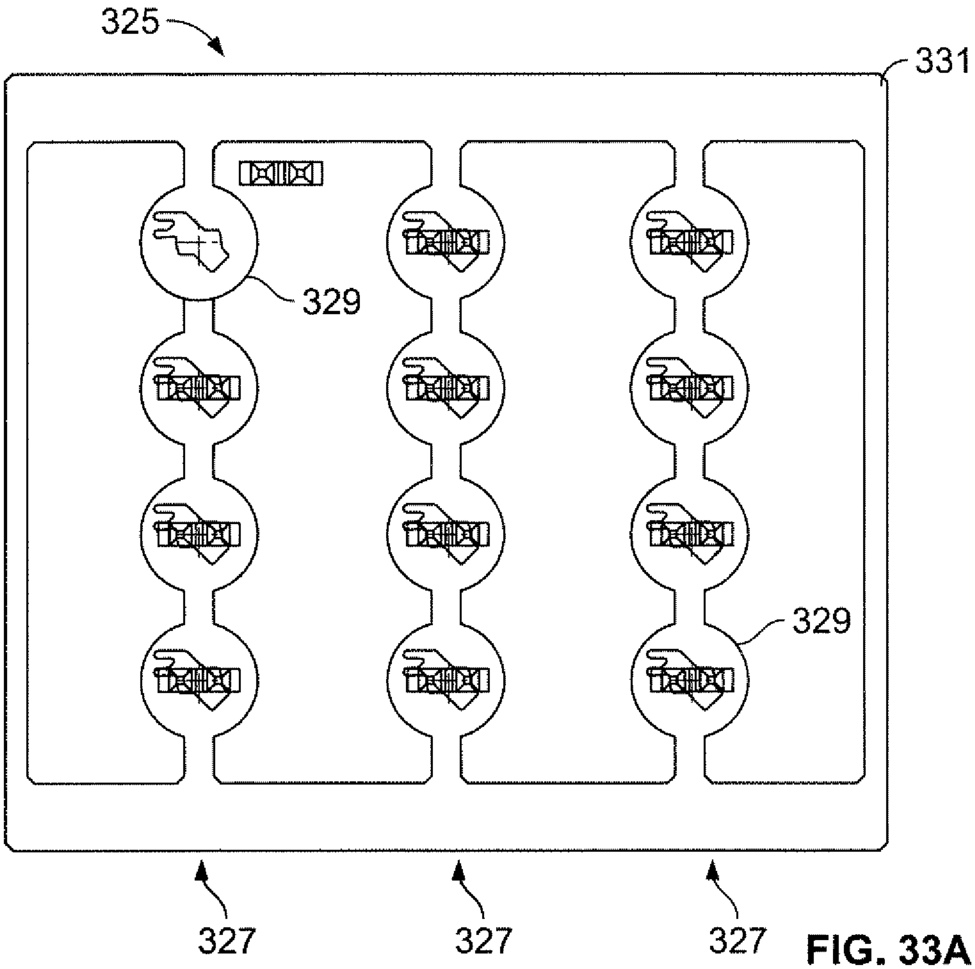
Figure 33B:
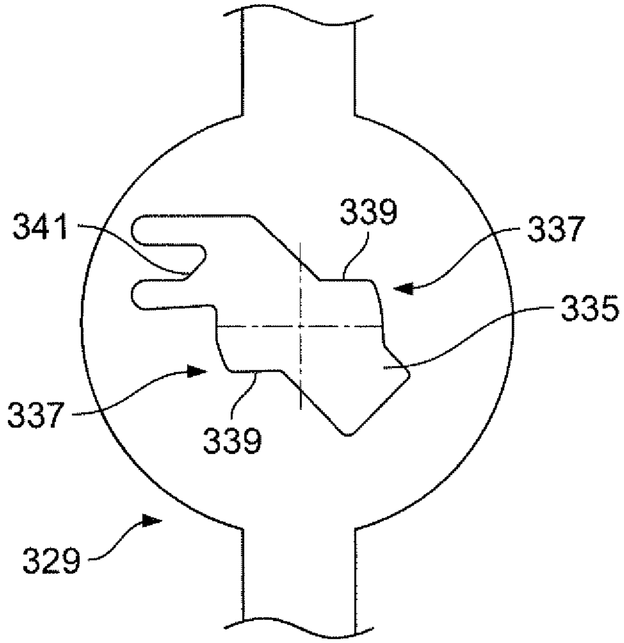

FIGS. 33*a* and 33*b* show another mode of attachment of the ceramic supports to the attachment nodes.

DETAILED DESCRIPTION OF THE INVENTION

The inventive heater rack offers a number of advantages over the heater racks of the prior art. In contrast to many of the prior art heater rack designs, the inventive heater racks are configured to eliminate metal in areas where coils could sag and cause short circuiting. The inventive heater rack also eliminates the problem of tooling access to the nodes receiving the ceramic supports since such nodes can be accessed from the top of bottom side of the racks for ceramic support attachment as a results of a slide and lock or twist and lock configuration for the attachment nodes.

Making the heater rack of a single piece of material allows the creation of other areas on the rack to accommodate mounting of other heater components, permitting folding of certain parts of the heater rack to impart strength to the rack, and offer other mounting capabilities for heater components. This creation of other areas as an integral part of the rack also allows providing configuration in these other areas that assist in control of air flow over or through the heater rack.

One example of the inventive heater rack of the invention is shown in FIGS. 8*a*-8*c*. These figures address the attachment node aspect of the invention. Later figures illustrate the other features of the inventive rack in terms of adding other features to the heater rack to improve its capability in different heater applications.

FIGS. 8*a* and 8*b* show one embodiment of the invention as a portion of a heater rack in plan view. The portion of the heater rack shown in FIG. 8*a* is designated by the reference numeral 40. It should be understood that the heater rack includes peripheral structure beside that intended to attach to ceramic supports. The peripheral structure can include members forming a periphery of the rack and structure that provides support and/or places of attachment for other heater components that could be associated with the heater rack, e.g., thermostats, terminals, temperature limiting switches, and the like.

The heater rack is a one-piece structure that is made of a material sufficient to withstand the heating produced by a heater utilizing the rack. These materials can be any known materials used in heater racks supporting open type coil electrical resistance heating elements, e.g., sheet metal. The heater rack can be made in any way but a typical way is starting with a sheet material and performing one or more stamping steps on the sheet material to form the heater rack. Depending on the heater application, the heater rack may also be subjected to further working steps, e.g., folding parts of the rack, providing additional openings in the rack, e.g., forming a screw pocket and the like.

The heater rack portion 40 in FIG. 8*a* includes an array 41 of spaced-apart attachment nodes 43. The attachment nodes 43 include a peripheral portion 47 that creates an opening 49.

The heater rack portion 40 also includes a number of connecting arms 51. The connecting arms 51 extend between adjacent attachment nodes 43. At the end of the array 41, the connecting arms 51 would extend between the attachment node and another part of the heater rack structure, which could be a peripheral portion or a portion designed to support other heater components.

The heater rack portion 40 is also shown with ceramic supports 53 fixed to the attachment nodes 43 and coils 55 supported by the ceramic supports 53.

Referring to FIG. 8*b*, the opening 49 formed by the peripheral portion 47 of the attachment node 43 has dual functionality. In one mode, the opening 49 forms at least one space 57 that is sized to allow the ceramic support 53 to be fit into the space 57 from the top surface of the heater rack portion 40, designated by reference numeral 59, or the opposite or bottom side, which is not visible in FIG. 8*b*.

Figure 1:
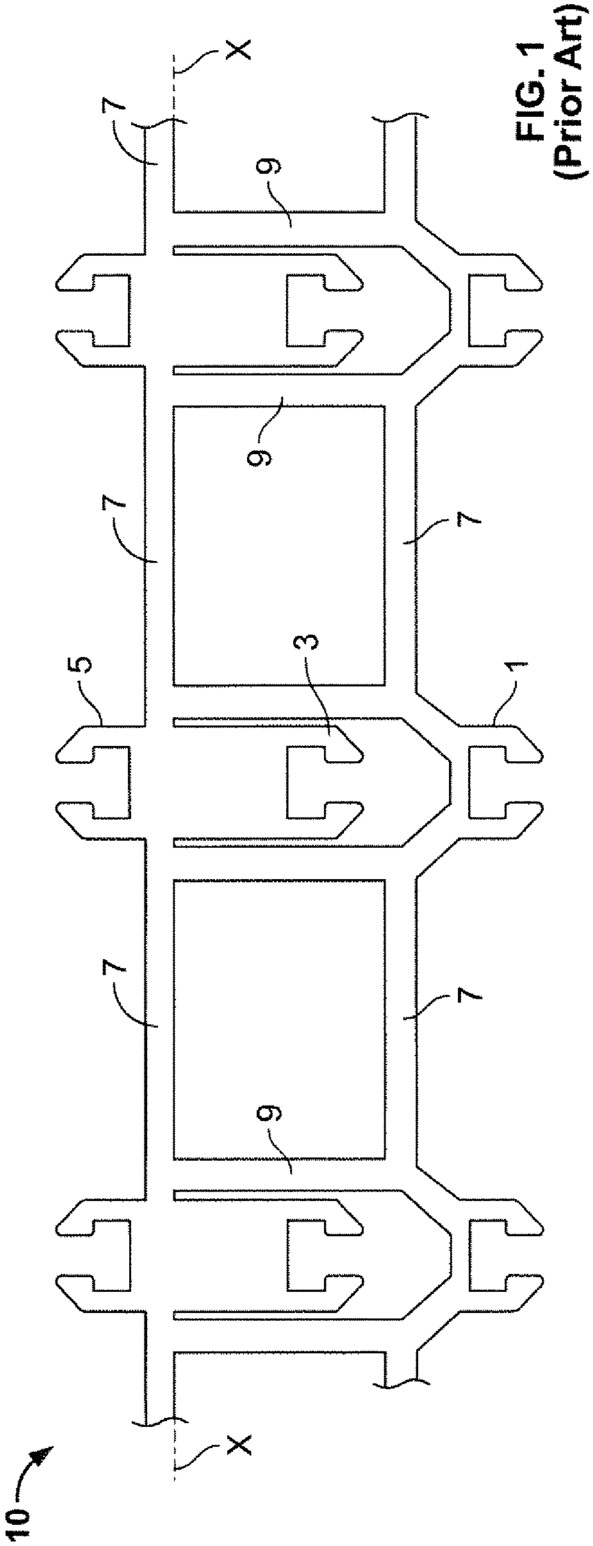
FIG. 1 (Prior Art)
FIG. 1 shows a plan view of a part of a heater rack of the prior art.
Figure 2:
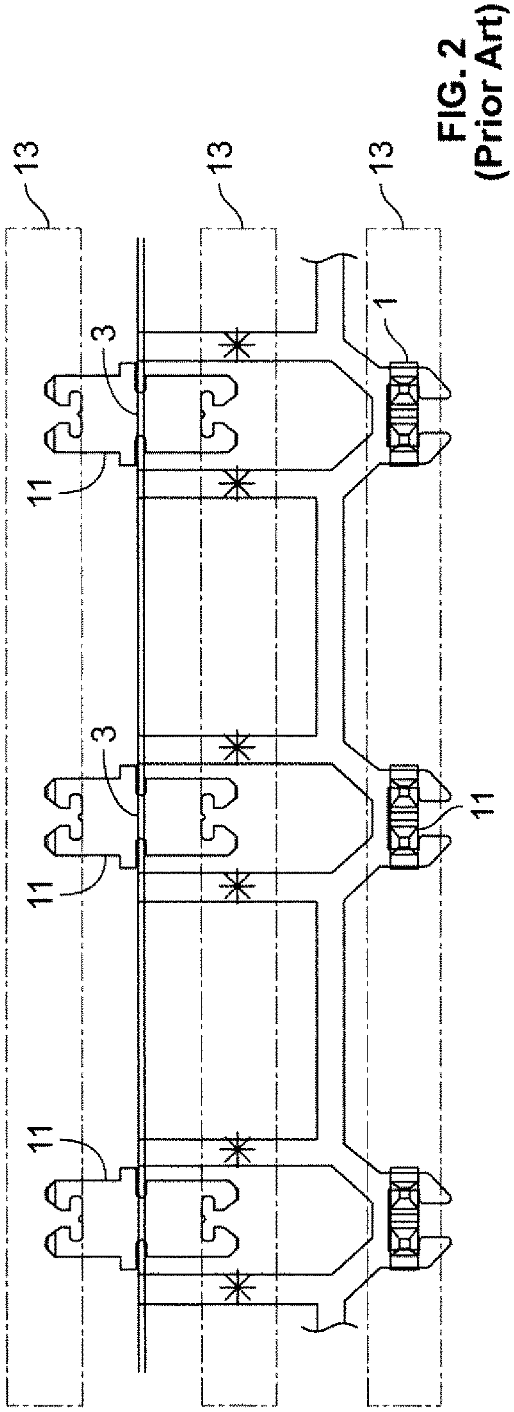
FIG. 2 (Prior Art)
FIG. 2 shows the heater rack of FIG. 1 in a bent configuration with ceramic supports for supporting open coil resistance elements.
Figure 3:
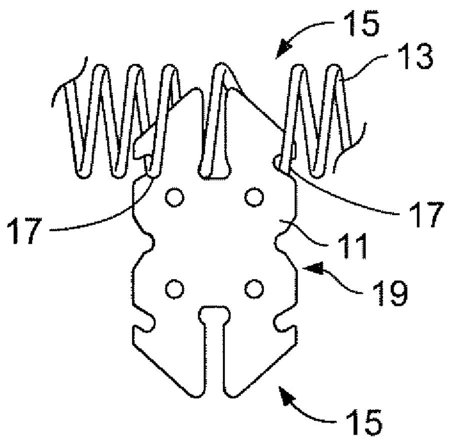
FIG. 3 (Prior Art)
FIG. 3 shows a prior art attachment between a ceramic support and a coil for a heater.
Figure 4:
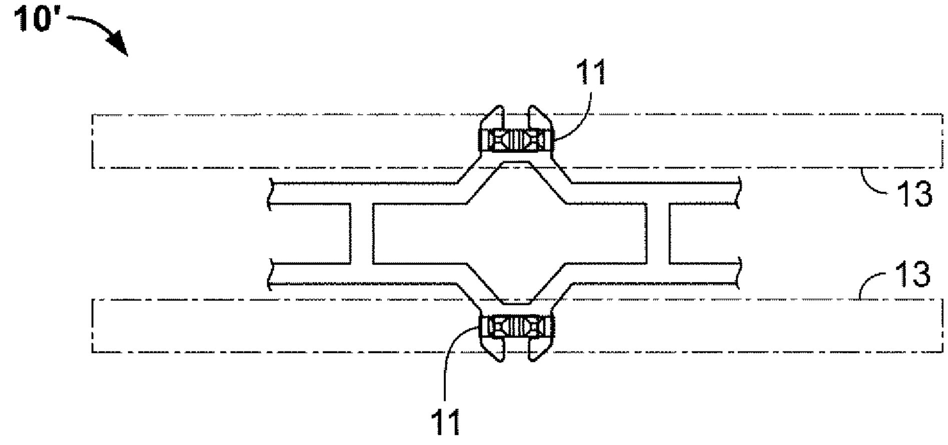
FIG. 4 shows another arrangement of the heater rack assembly of FIG. 2.
Figure 5:
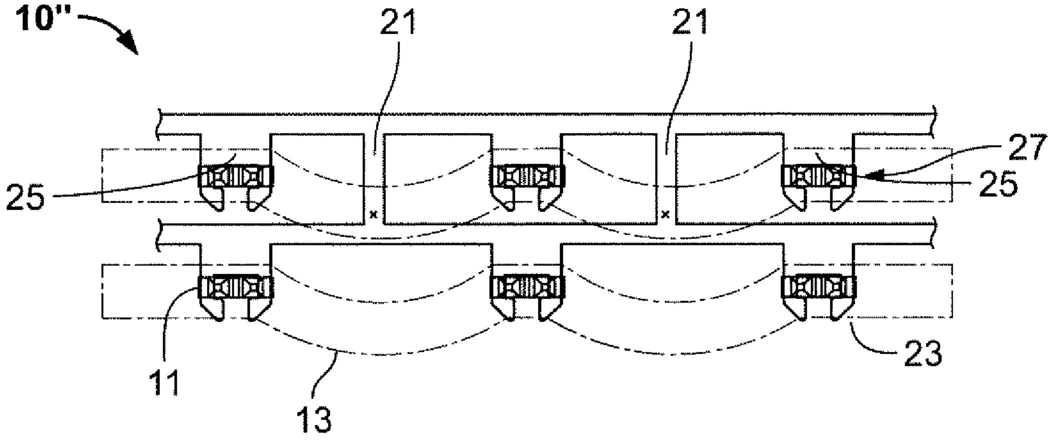
FIG. 5 shows yet another arrangement of the heater rack assembly of FIG. 2.
Figure 6:
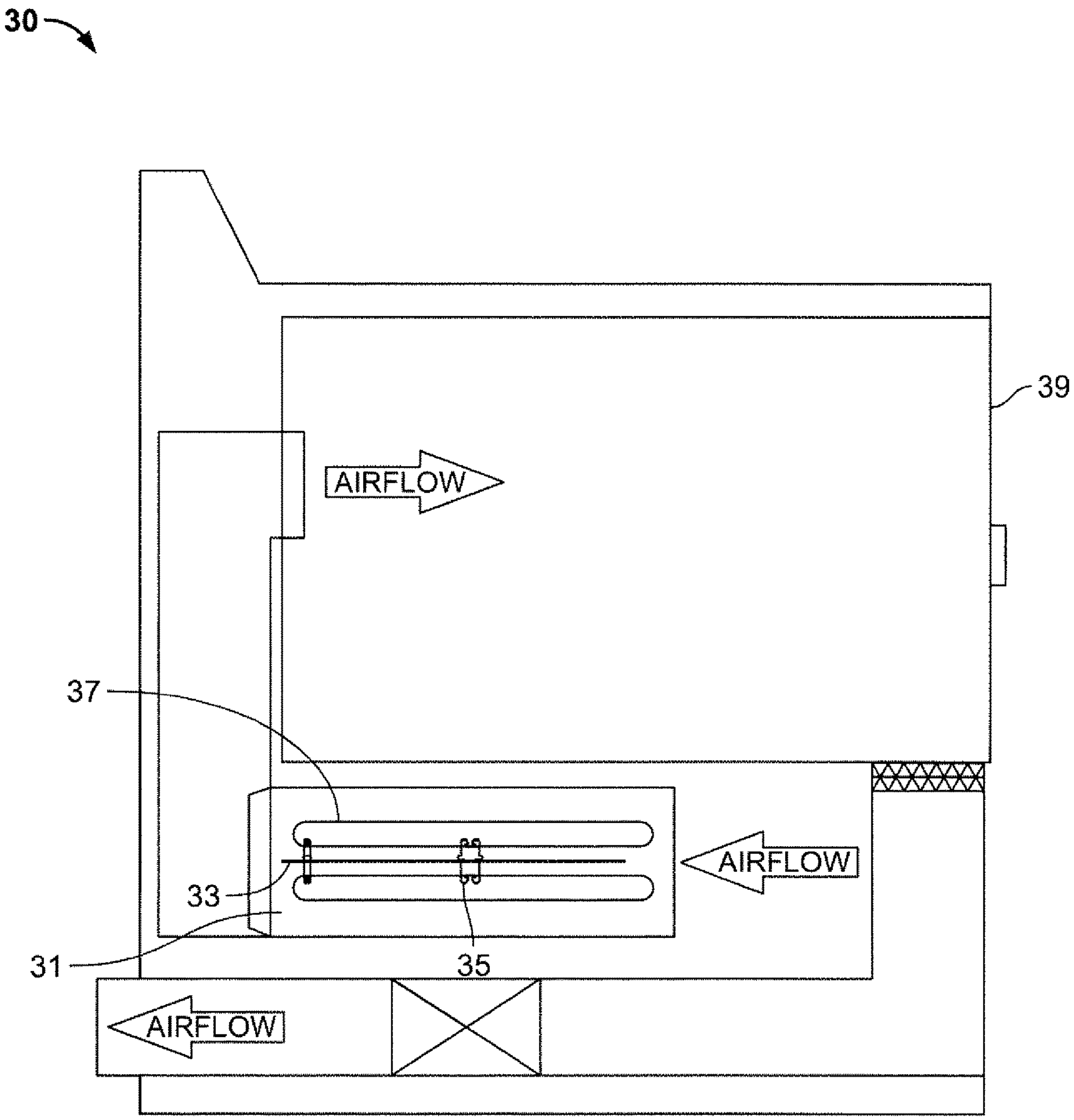
FIG. 6 shows a schematic drawing of a clothes dryer having a heater as a part thereof.
Figure 7:
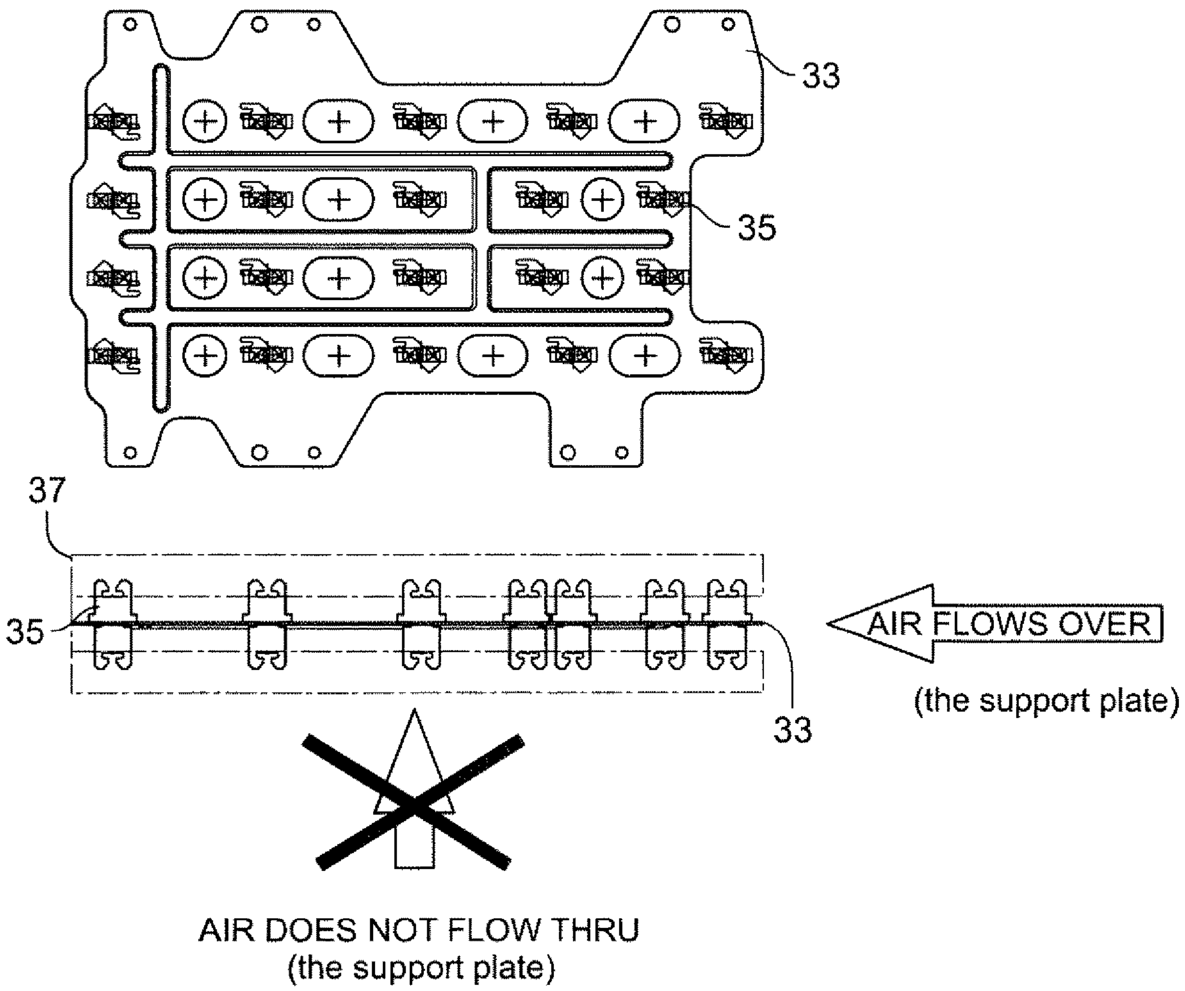
FIG. 7 shows the heater of the clothes dryer of FIG. 6.

The opening 49 includes a second space 61. Space 61 is smaller in size as compared to space 57 and is designed to receive and retain the ceramic support 53 to the attachment mode 43. As shown in FIG. 3, a typical ceramic support is designed with a narrowed central portion or slots 19. The ceramic support 53 is similarly configured so that the ceramic support 53, once positioned in the space 57 is slid into the space 61 so that the slots of the ceramic support pass over the tabs 65 of the attachment node 43 and engage the edges 67 of the space 61. Once the ceramic support 53 is slid into space 61, the tabs 65 can be bent to secure the ceramic support 53 in place.

FIG. 8*a* shows the attachment node 43 with two spaces 61 so that two ceramic supports can be attached to the node 43 by being positioned in the space 57 and then slid and locked into place.

FIG. 8*c* shows a variation of the attachment node 43 as an array 44. In this embodiment, the opening 49 is divided into two separate openings 49*a* and 49*b* by cross arm 67. With this configuration, each ceramic support is positioned in the openings 49*a* and 49*b* and slid into the spaces 61 for attachment as described above.

The configuration of the attachment nodes in FIGS. 8*a* and 8*c* provide the advantage that the ceramic supports can be moved into place in the attachment nodes from either the top or bottom of the rack and there is no access problem for ceramic support attachment. Also, the position of the openings or space 57 and the space or opening 61 can be altered to change the position of the coil mounted to a ceramic support positioned in space or opening 61 and this difference in positioning is shown in FIG. 11 below.

Referring now to FIG. 9, the array 41 of FIG. 8*a* is combined with another array using the connecting arm 71. In this embodiment, the presence of the peripheral portions 47 of the attachment node 43 provide additional material to allow the connecting arms 71 to extend between adjacent attachment nodes. This then enables more attachment nodes to be used for a heater rack and provide more heating capacity, if needed.

FIG. 10 shows yet another variation of the heater rack of FIG. 8*a*. In this embodiment, another and limited array 73 of attachment nodes is positioned between the two arrays 41 and 44. Unlike the arrays 41, wherein the connecting arms 51 would ultimately connect to a peripheral structure of the heater rack, the end attachment nodes 75 and 77 only have connecting arms 51 that link to the attachment node 79 therebetween. With this embodiment, additional coil supports can be provided that do not necessarily extend the length of adjacent arrays of attachment nodes to give the heater design additional flexibility when configuring the heater and its coil arrangement. This embodiment also does not have the sagging problem and short circuit possibility mentioned above. In FIG. 10, a zone 81 is identified where the coil 55 may sag. There is no rack structure in zone 81 so that even if some sagging would occur, there is no metal present for contact with the coil and a short circuiting problem in zones where sagging may occur is avoided.

By having the peripheral portion as part of the attachment node, the attachment node or nodes can also be directly linked or be part of a periphery of the heater rack that is configured to provide strength to the heater rack and mounting capabilities. Referring to FIG. 11, two arrays 83 and 85 of attachment nodes are shown positioned between two peripheral members 87 and 89 of the heater rack itself. A segment 91 of each of the peripheral members 87 and 89 form part of the opening 93 of the attachment nodes 95. The peripheral members 87 and 89 could include a folded part represented by the dashed line, the folded part providing additional strength to the heater rack as well as mounting capability. With this arrangement, a single one-piece rack can be made that provides both coil support, and strength and mounting capability without the need to add other parts to the heater rack itself.

Also, the attachment nodes 95 can be configured differently along a given array, the second openings receiving the ceramic supports positioned so that the ceramic support 96 positions the coil 94 away from the peripheral member 89 to avoid short circuit protection. If the attachment nodes were all configured the same way, the coil 94 would be positioned over the peripheral member 89 and short circuiting could occur with coil sag.

As noted above, the different arrays of attachment nodes ultimately terminate as some peripheral part of the heater rack itself. FIG. 11 actually shows one embodiment of this wherein the arrays 83 and 85 terminate at the peripheral members 87 and 89 of the heater rack.

It should also be noted that the attachment nodes 95 are designed to hold one ceramic support. This differs from the configuration in FIGS. 8*a*-8*c*, wherein a given attachment node can be configured to hold two ceramic supports. While FIGS. 8*a*-8*c* hold two ceramic supports, the attachment node could be configured to hold more than to ceramic supports if so desired by adding additional spaces to receive the ceramic support in the embodiment of FIG. 8*c*.

FIG. 12 shows the heater rack portion of FIG. 11 with an additional peripheral member 98, which allows for more flexibility in terms of mounting the heater rack in a given heater.

FIGS. 13*a* and 13*b* show a completed heater rack 100, based on the embodiment of FIGS. 11 and 12. In this embodiment, the end of the peripheral members 87 and 89 not attached to the peripheral member 98 includes a plate member 101. As described above, the entire heater rack is stamp formed to form a planar heater rack with the attachment nodes, connecting arms, peripheral members and plate member. The plate member 101 can be bent at the line Y-Y in FIG. 13*a* so that it is perpendicular to the plane of the remaining part of the heater rack 100 as is shown in the end view of FIG. 13*b*. The plate member can provide a mounting surface for heater components, for example, terminals 103 and a thermostat 105. These components are only examples and any heater component could be mounted to the plate 101. The heater rack 100 of FIGS. 13*a* and 13*b* is simply made by stamping the heater rack and bending, no welding or use of fasteners is required.

The heater rack of FIGS. 13*a*-13*b* also allows for the flexibility of changing the position of the coils being supported by the heater rack. In FIGS. 13*a* and 13*b*, the attachment nodes 95 are arranged such that the spacing between coils is generally uniform. However, the heater rack could be made with the attachment nodes 95 of the arrays with different relative spacing.

In FIGS. 14*a* and 14*b*, the attachment node arrays 83 and 85 each have three attachment nodes 95*a*, 95*b*, and 95*c*. Attachment nodes 95*a* and 95*b* are arranged in the heater rack to be closer together, thus creating a larger gap between attachment nodes 95*b* and 95*c*. This flexibility allows the positions of the coils to be shifted from one position to another to accommodate areas of air flow that may be higher or lower for the heater application.

The use of the plate member in FIGS. 13*a* and 13*b* also provide an advantage in terms of minimizing waste when making the inventive heater rack. Unlike other heater rack designs that can end up with a large amount of wasted material, retaining one or more plate members when making the heater rack reduces material waste and contributes to a manufacturing costs saving while at the same time providing functional area on the heater rack for various functionalities like mounting heater components, configuring the plate members for air flow control, etc. The inventive heater rack also allows flexibility in terms of locating a thermostat. In certain heater applications, it may be preferred to not have the thermostat at an end of the heater rack as shown in FIGS. 13*a* to 14*b*. Referring now to FIGS. 15*a* and 15*b*, another variation of the inventive heater rack is shown and designated by the reference numeral 110. In this embodiment, two arrays 111 and 113 of unevenly spaced attachment nodes 115*a-c* and 117*a-c* are provided between peripheral members 119 and 121. A plate member 123 is provided similar to that shown in FIGS. 13*a* to 14*b*.

Between the two arrays 111 and 113 is a thermostat attachment node 127, which extends between the connecting arms 129 and 131 between the attachment nodes 115*a* and 115*b* and 117*a* and 117*b*. The node 127 includes a pair of connecting aims 128 that extend between connecting arms 129, 131 of the arrays 111 and 113. In certain heater applications, it may be desirable to have the thermostat somewhere in the conditioned air space and the inventive heater rack configuration allows this flexibility. While a thermostat is shown positioned between the arrays 111 and 113, other heater components could be mounted where the thermostat is shown.

FIGS. 16*a* and 16*b* show another way to mount a thermostat using the inventive heater rack. This heater rack is designated by the reference numeral 130 and includes not only a plate member 131 on an end of the rack but also a second plate member 133 that is made part of the peripheral member 135. Here, the thermostat is mounted in a location that is previously been recognized as difficult to mount due to prior art heater rack designs.

Figure 17B:
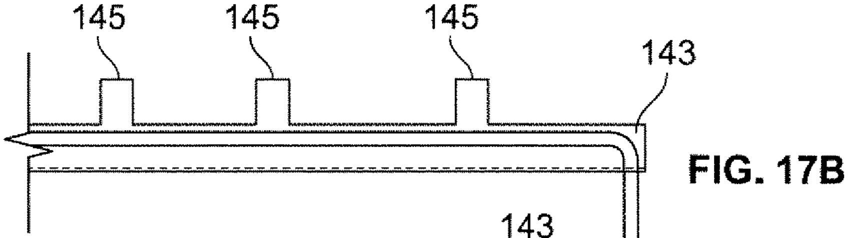
Figure 17A:
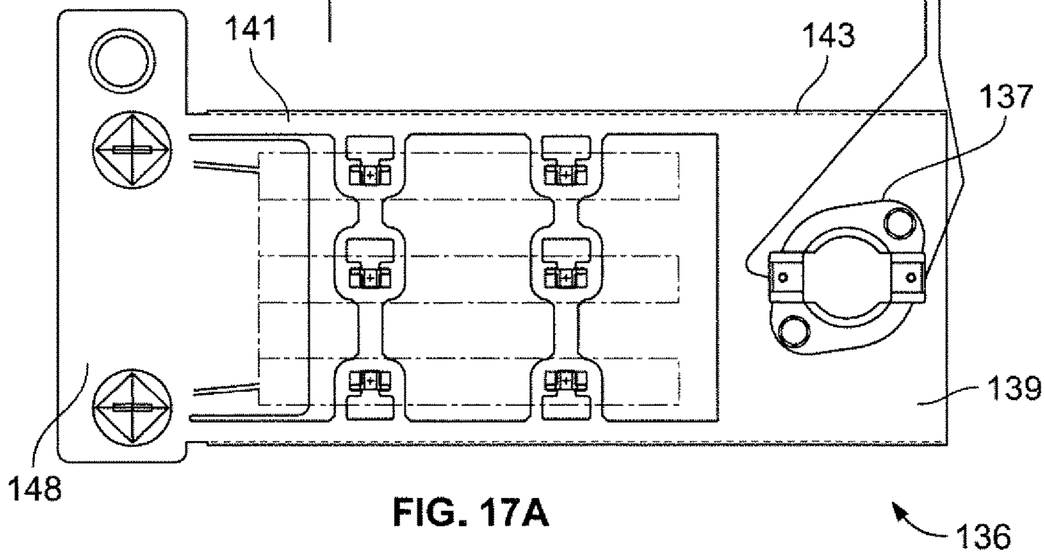
Figure 17C:
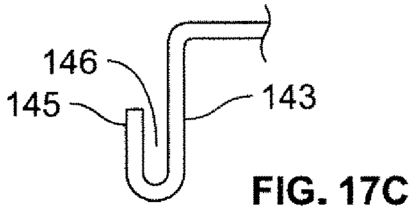

When a thermostat or other heater component requiring wiring to be run along the heater rack is used, the peripheral parts of the heater rack can also be configured to provide support for wiring. Referring to FIGS. 17*a*-17*c*, a heater rack 136 is shown with a thermostat 137 mounted on a plate member 139. Similar to the rack portion shown in FIG. 11, the peripheral member 141 has a folded down part 143. Referring to FIG. 17*b*, this folded down part 143 can include securement tabs 145. The securement tabs 145 can be folded as shown in FIG. 17*c* to form a channel 146 to hold wires extending from the thermostat or other wire-bearing component of the heater. With this heater rack configuration of FIGS. 17*a*-17*c*, the folded down part provides a radiant barrier to protect the wires along their routing. Although not shown, the plate member 148 would be folded like the plate member 131 in FIGS. 16*a* and 16*b*.

What FIGS. 14*a*-17*c* show is the ease with which coils could be moved around to suit the equipment and its performance. Typical prior art methods used to produce this same kind of performance involve the configurations and usage of many different individual parts to hold the support ceramics in place. These methods make the assembly very difficult and time consuming, where using this new method is simple and requires only the one uniquely designed part. As well, the fact that the structure is already provided as the heater rack, it is simple to include safety devices and or monitoring devices into the design. With prior art racks, e.g., those shown in the above-noted U.S. Pat. Nos. 6,433,318 and 6,600,141 to Danko et al., this would have required many different individual components having to be made separately and assembled together and these prior art methods are greatly simplified by using the inventive heater rack.

In addition to providing structure to position a heater component like a thermostat in the area where the attachment nodes reside, see for example, FIG. 15*a*, FIG. 18*a* shows a heater rack 150 that uses a screw pocket 151 to hold a linear temperature limit device 153 symmetrically between the attachment nodes 155 and coils held thereby. The linear temperature limit device 153 has a gas filled bulb that senses temperature along its length. The screw pocket is shown in more detail in FIG. 18*b*, where it has alternating and spaced apart segments 157 and 159 that cooperate to hold the temperature limit device 153 in place and maintain an electrical clearance. The placement of the screw pocket 151 is similar to that of the thermostat shown in FIG. 15*a*. That is, a connecting arm 161 is positioned between the attachment nodes in the arrays of attachment nodes extending between the peripheral members 163 and 165 of the heater rack 150. The switching portion of the device 153 is shown mounted to the plate member 158 but it could be mounted elsewhere on the heater rack or even remote from the heater rack. With the center location of the temperature limit device, the device would function symmetrically, which would allow the heater rack 150 to be positioned in a number of orientations while still maintaining the functionality of the temperature limit switch. The inventive heater rack also allows the device 153 mounting without the need for any additional structure, welding, fastening, and the like.

Besides providing structural support by folded part and plate members for component mounting, the peripheral structure of the heater rack can also be used to better control air flowing through or flowing over the heater rack. Air flow can always be a concern in HVAC equipment but with the inventive heater rack design, the rack itself can be made with features to assist in controlling air flow, such features not require the use of other parts and extra steps involving welding, fastening, or the like.

Referring now to FIGS. 19 and 20, portions of heater racks 167 and 169 are shown. For heater rack 167, the peripheral plate member 171 that terminates the two peripheral members 173 and 175 includes a plurality of openings 177 distributed over the plate member surface. By providing the plate-like member 171 with openings instead of just a peripheral elongated member like shown in FIG. 18*a*, air flowing through the heater rack can be influenced. While the openings are shown as circular in shape, virtually any type of openings can be used to enhance the control of air flow for a given heater application.

Referring to FIG. 20, other features that can be incorporated into a plate peripheral member of a heater rack include a foldable deflector. In FIG. 20, the rack 169 has a plate member 178 that has a foldable member 179 as a part thereof. When forming the rack 169, the plate member 178 can include slots 181 and a perforated line of relief holes 183. The foldable member 179 can then be bent at the perforated line 183 to create a baffle to direct air in a given direction. With the relief holes, the foldable member 179 can be easily bent by hand. The location of the foldable member 179 in FIG. 20 is only exemplary and other configurations of a foldable member and locations could be used as part of the heater rack.

FIG. 20 also shows another shape and arrangement of openings 185 for air flow control. With the area provided by the plate members 171 and 178 in FIGS. 19 and 20, this area can be easily customized for a given heater application for air flow control, but without the need for welding, using other components, and the like. The one-piece heater rack only need to be configured with openings, foldable members, or combinations thereof for a desired air flow enhancement. The advantage of the FIG. 20 embodiment is that using the combination of the deflector 179 can control air flow over the heater rack and the openings 185 can provide control of air flow through the heater rack. This dual air flow control is provided with only the parts of the heater rack itself, no other individual parts are required that would require further attachment to the heater rack.

The unique attachment nodes of the inventive rack can also be combined with conventional designs to support coils. FIG. 21 shows a portion 187 of a heater rack similar to that shown in FIG. 20. The portion 187 of a heater rack has arrays 189 and 191 of attachment nodes 193 extending between peripheral members 195 and 197. Also included is an array 199 of string-through style coil supports 201 like those shown in the Engelke patent mentioned above. With this combination of coil supports, the coil 203 held by ceramic supports 205 can pass through the coil support 201 if the heater designer would prefer having the string-through supports at the end of the coil travel on one side of the heater rack.

By virtue of the forming of the heater rack from a sheet of material by stamping or the like, the alignment direction of the attachment node array can be altered. While the arrays shown in FIG. 9, for example, are linear, the attachment nodes could be located so that the travel of the coil takes a non-linear path. Referring to FIG. 22, a heater rack 207 similar to the one shown in FIG. 15*a* is illustrated. Heater rack 207 has a number of attachment nodes 209 and corresponding connecting arms 211 that extend orthogonally from the peripheral members 213 and 215. The openings in the attachment nodes 209 are offset or angled from the longitudinal axis of the array containing the attachment nodes, this offset or angling allowing the coil 217 to travel in a non-linear path. Other connecting arms 215 with an attachment node 209 therebetween are provided and angled with respect to the peripheral members 213 and 215 so that the attachment node 209 is positioned properly to impart the necessary bend in the coil 217 to direct it back to the terminal 219 on plate member 221. As with the other embodiments, merely forming the rack with the necessary shapes of the connecting arms and attachment nodes allows for endless configurations to configure one or more coils in a desired orientation.

Beside varying the location of the attachment nodes, the size of the attachment nodes can be changed in a given heater rack. FIG. 23 shows a portion 223 of a heater rack having a first set of attachment nodes 225 and a second and larger set of attachment nodes 227. With this arrangement, differently-sized coils, e.g., 0.500 inch and 0.750 inch in diameter, can be combined in one heater rack.

Also, the different sized attachment nodes can accommodate a change in coil size for one coil as shown in the heater rack portion 229 of FIG. 24. Here, attachment nodes 225 support a portion of coil 231 and the larger attachment nodes 227 support the same coil 231 along its changed diameter length.

FIGS. 25*a-c* show an example of heater rack 233 that has eleven connected arrays 233 of attachment nodes 237, 239, 241. In this embodiment, each the attachment nodes 237 has a segment 240 of the peripheral member 243 aiding in forming the opening 245 designed to receive a ceramic support. The peripheral member 243 also includes a folding part 244. The heater rack 233 also includes end peripheral members 249 and their foldable part 251. The attachment node 241 and the connecting arms 247 actually form another peripheral structure of the heater rack. FIG. 25*a* shows the rack before forming any folded part. FIG. 25*b* shows a side view having the peripheral member 243 after folding. FIG. 25*c* shows an end view, where the peripheral member 249 are folded. The heater rack 233 exemplifies a simple rack design that can hold 33 ceramic supports and support a considerable length of coil without having metal supports present in the heater rack where coil sag could occur.

With the inventive rack design, not only can simple designs be made as shown in FIGS. 25*a-c* but very complex designs such as that shown in the heater rack 251 shown in FIGS. 26*a-c*. The heater rack 251 is shown in the unfolded state in FIG. 26*a* and is folded along lines C, D, E, and F to form the heater rack shown in FIG. 26*b* with the end view shown in FIG. 26*c*. This design includes the arrays of attachment nodes and peripheral structure like the other racks described above. The openings 252 can be used for wire routing and terminals, the openings 254 between the arrays of attachment nodes allow for air flow through the rack, the openings 256 can serve as mounts for heating components like thermostats as well as providing control of air flow over the heater rack. The holes 258 on the corners of the heater rack 251 can be used to receive fasteners and the like once the heater rack is folded in its usable configuration. The openings 254 also create the space between the second openings in the attachment nodes that hold the ceramic supports and absence of structure of the heater rack to provide an opportunity for short circuiting if the coil should sag between the ceramic supports.

FIG. 27 shows an alternative attachment node array design. In other designs shown above, e.g., FIG. 17*a*, the attachment node is positioned between connecting arms wherein the connecting anus are more narrow in width as compared to the attachment nodes. In FIG. 27, the rack 253 has attachment node arrays 255 that are formed of a uniformly shaped arm 257 positioned between the peripheral members 259 and 261, with the required opening 263 for the attachment node formed in the arm 257. In this embodiment, the structure between the peripheral members is more robust given the larger sized arm. While the arrays in FIG. 27 only contain two attachment nodes, more than two attachment nodes should be positioned in the arms 257 and a rack 265 could be configured with two heater racks 267 and 269 combined together as shown in FIG. 28.

Another example of a custom design heater rack is shown in FIG. 29 and designated by the reference numeral 271. This heater rack combines a number of features described above such as air flow openings 273 in one of the peripheral members 275 of the heater rack 271. The peripheral member is also configured with a plate area 277 to mount a thermostat 279. The heater rack 271 also includes arrays of attachment nodes 281, which are the type to hold just one ceramic support 283. Also, there are attachment nodes that are not linearly aligned, i.e., nodes 285, which are located in the plate area 277 to allow the coil 287 to properly terminate at terminals 289. In this heater rack, the coil spans only the front or top side of the rack and the thermostat 279 is wired from the back side of the rack to avoid radiant heat issues.

Yet another example of a heater rack is shown in FIGS. 30*a* and 30*b* and is designated by the reference numeral 291. The heater rack is shown in its flat or planar configuration in FIG. 30*a* without showing the coil and its coil run and its folded configuration as shown in FIG. 30*b* with the coil being depicted in dashed lines. Referring to FIG. 30*a* first, a plate member 293 is provided between the two middle arrays 295 and 297 of the attachments nodes. The plate member 293 is configured to mount a thermostat and terminals. The plate member 293 is also shaped so that a portion 299 can be folded along line O-O. When the portion 299 is folded, see FIG. 30*b*, a thermostat 301 is mounted thereto such that the thermostat can be positioned directly above the middle of the coil. Also, coil terminating wiring 303 can be routed out the back of the plate member 293. This is another example of a custom heater rack configuration that can be easily manufactured from a single sheet of material.

The heater rack 291 shown in FIGS. 30*a* and 30*b* can be made in a folded configuration as shown in the heater rack 305 of FIGS. 31*a* and 31*b*. This heater rack is similar to that of FIGS. 30*a* and 30*b* with the use of the centrally located thermostat mounting, which is designated as 306 in FIG. 31*a*. However, the heater rack 305 is made with basically two rack sections 307 and 309, each of which being like the configuration of the heater rack 291. The two sections are separated by a plate section 311, the plate section including openings 313 and relief holes 315. The openings 313 allow for wiring to pass through the openings and be routed away from the coils and radiant heat. The relief holes 315 allow the heater rack 305 to be bent or folded along lines M-M so as to create the configuration shown in FIG. 31*b*. With this style of heater rack, the heater rack, made of one piece can be assembled with the rack sections 307 and 309 facing each other so that the heater rack as a u-shape as shown in FIG. 31*b*.

FIG. 32 shows a variation on the heater rack of FIGS. 31*a* and 31*b*. In this Figure, the heater rack is designated by the reference numeral 317 and includes plate sections 319 similar to the plate sections 306 in FIG. 31*a*. Instead of a thermostat mounting, a ceramic support 321 is mounted to each plate section 319 using either the attachment node configuration of the invention or a conventional one. With this configuration, if the heater design would have the coil 323 span a distance that could cause sagging or other problem, the ceramic support 321 can engage a portion of the coil for support. Again, this variation is accomplished still using just a single one-piece heater rack and does not require any welding, extra fastening or fasteners, or the like.

FIGS. 33*a* and 33*b* show an alternative to the slide and lock attachment described above for the attachment nodes, see FIGS. 8*a-c*. FIG. 33*a* shows a simple heater rack designated by the reference numeral 325. The rack 325 includes a number of arrays 327 of attachment nodes 329, a peripheral structure 331, and ceramic supports 333. One attachment node 329 is shown without the ceramic support attached thereto and FIG. 33*b* shows the attachment node enlarged to show more detail. Instead of the slide and lock feature, attachment node 329 uses a twist and lock feature. Referring to FIG. 33*b*, the attachment node has an opening 335 that includes a rectangular shape that allows the ceramic support to be inserted into the opening 335 from the top or bottom of the heater rack, which is similar to the positioning of the ceramic support shown in FIGS. 8*a*-8*c*. The ceramic support 333 is inserted into the opening 335 so that the central part of the ceramic support is aligned with the plane of the attachment node 329. The opening 335 also includes two notches 337. The notches 337 allow the ceramic support to be twisted so that the edges 339 of the notches engages the grooves that would be located in the central part of the ceramic support 333. The opening 335 also includes a locking tab 341, that is designed to be bent once the ceramic support is twisted. The bent locking tab 341 prevents a reverse twist of the ceramic support and possible release from the attachment node 329. The twist and lock feature of FIGS. 33*a* and 33*b* provide the same advantage as the slide and lock feature explained in FIGS. 8*a*-8*c* in that the ceramic support can be secured to the attachment node from the top or bottom side of the rack; access from an edge or side of the attachment node is not required for ceramic support attachment.

As described above, the heater rack of the invention can be considered a base part of a heater assembly, wherein the heater rack provides mounting locations for the ceramic supports that hold the coils of the heater assembly and various heater assembly components like terminals, temperature limit switches, thermostats and the like. The heater rack can then be mounted using the peripheral structure in a given device or apparatus that requires the use of a heater rack assembly or mounted to the device or apparatus using some intervening components linking the peripheral structure and the device and apparatus.

The heater rack can be used in virtually any method that requires conditioning of a space using a heated fluid like air. Examples include heating air flowing through ducts, heating air in an appliance like a clothes dryer, and other known methods where heating using open type coil electrical resistance elements is provided.

As such, an invention has been disclosed in terms of preferred embodiments thereof which fulfills each and every one of the objects of the present invention as set forth above and provides a new and improved heater rack for use in heater assemblies that use ceramic supports and open type electrical resistance heating elements and a method of use.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A one-piece heater rack for supporting open coil electrical resistance heater elements using ceramic supports comprises a single sheet of material having a front side and a back side, the single sheet of material further comprising:

a peripheral structure, and a plurality of arrays of attachment nodes, each attachment node configured to secure at least one ceramic support to the attachment node, the attachment nodes extending between portions of the peripheral structure, each attachment node having a peripheral portion that forms:

a first opening configured to allow a ceramic support to be positioned in the first opening from either the front side or the back side, a second opening configured to receive a central portion of the ceramic support by either sliding or twisting of the ceramic support, the peripheral portion completely surrounding both the first and second openings, and including a tab extending into the second opening to retain the ceramic support in the second opening by tab bending.

2. The one-piece heater rack of claim 1, further comprising at least one plate member, the at least one plate member being part of the peripheral structure, being positioned between adjacent attachment nodes or between adjacent attachment node arrays, the at least one plate member having one or more openings therein to either facilitate mounting of heater components to the at least one plate member, control air flow over or through the one-piece heater rack, and/or permit bending of parts of the at least one plate member.

3. The one-piece heater rack of claim 2, wherein the at least one plate member extends between two adjacent arrays of attachment nodes.

4. The one-piece heater rack of claim 3, wherein the plate member is foldable so that a portion of the plate member would be perpendicular to a plane of the one-piece heater rack when folded.

5. The one-piece heater rack of claim 2, wherein the at least one plate member is part of the peripheral structure, is located on an end portion of the one-piece heater rack, and is bendable such that the plate member would be perpendicular to a plane of the one-piece heater rack once bent.

6. The one-piece heater rack of claim 2, comprising two plate members, one plate member being part of the peripheral structure and located on an end portion of the one-piece heater rack and one plate member being part of the peripheral structure and located on a side portion of the one-piece heater rack.

7. The one-piece heater rack of claim 1, wherein attachment nodes in one or more of the plurality of arrays are either evenly or unevenly spaced along the array.

8. The one-piece heater rack of claim 1, wherein the attachment nodes include at least two different sizes to hold different sized ceramic supports.

9. The one-piece heater rack of claim 1, wherein each array of attachment nodes comprises connecting arms between adjacent attachment nodes.

10. The one-piece heater rack of claim 9, wherein a width of each connecting arm in the array of attachment nodes is less than a width of the attachment node or the same width as the attachment node.

11. The one-piece heater rack of claim 9, wherein a portion of the peripheral portion of the attachment nodes and the connecting arms positioned adjacent the attachment nodes having the portion of the peripheral portion form a part of the peripheral structure of the one-piece heater rack.

12. The one-piece heater rack of claim 1, wherein adjacent second openings of attachment nodes in an array of attachment nodes or adjacent second openings in adjacent arrays of attachment nodes from a perspective of travel of an open type coil electrical resistance heater element between adjacent second openings are separated by an open space so that an open type coil electrical resistance element mounted on ceramic supports held in the adjacent second openings and that may sag over the open space do not contact a part of the one-piece heater rack and cause a short circuit.

13. The one-piece heater rack of claim 1, wherein each attachment node has at least two second openings to support a pair of ceramic supports.

14. The one-piece heater rack of claim 13, wherein each attachment node has at least two first openings and two second openings.

15. The one-piece heater rack of claim 1, wherein the second opening is in the form of a slot adjacent to the first opening, the slot adapted to slidably receive a central portion of the ceramic support for securement to the attachment node.

16. The one-piece heater rack of claim 1, wherein the second opening is in the form of a pair of cut-outs in opposing edges of the first opening, the pair of cut-outs receiving a central portion of the ceramic support upon twisting of the ceramic support.

17. The one-piece heater rack of claim 1, wherein the arrays of attachment nodes are parallel to each other.

18. The one-piece heater rack of claim 1, wherein the attachment nodes in one array are interconnected by first connecting arms and adjacent arrays of the attachment nodes are interconnected by second connecting arms.

19. The one-piece heater rack of claim 1, wherein the peripheral structure includes a channel to receive wiring of heater components for radiant heat protection of the wiring.

20. The one-piece heater rack of claim 1, wherein the attachment nodes in one or more of the plurality of arrays are angled with respect to an array direction so that a coil mounted to ceramic supports held in the second openings of the angled attachment nodes would follow a non-linear path.

21. The one-piece heater rack of claim 1, further comprising two sets of the plurality of arrays of attachment nodes, the two sets of the plurality of arrays of attachment nodes separated by a plate section, the plate section bendable along two spaced apart lines extending along the plate section so that the two sets of plurality of arrays of attachment nodes would be parallel to each other after bending along the two spaced apart lines.

22. A heater assembly comprising:

one or more open coil resistance heater elements, a plurality of ceramic supports configured on at least one end thereof to engage and support the one or more open type coil electrical resistance heater elements, and a heater rack retaining the ceramic supports, the heater rack further comprising the one-piece heater rack of claim 1.

23. A method of heating a space using a heater assembly, comprising:

providing the heater assembly of claim 22 in the space; and supplying power to the heater assembly to heat said space.

* * * * *